Sept. 12, 1961 P. SCHAGEN ET AL 2,999,957
CATHODE RAY TUBE

Filed July 24, 1957 12 Sheets-Sheet 1

INVENTORS
P. SCHAGEN
N. D. R. CALDER
BY
Frank R. Trifari
AGENT

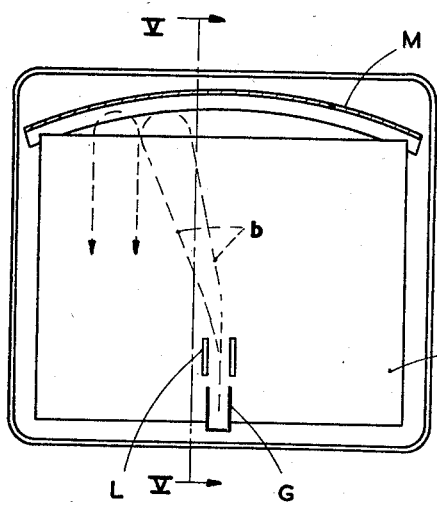
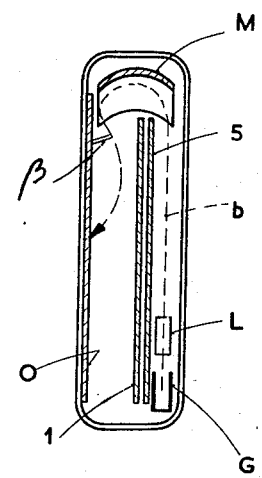
FIG. 4  FIG. 5
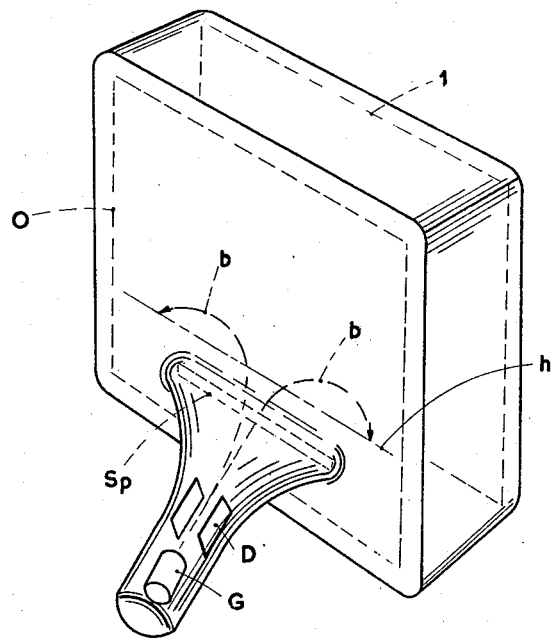
FIG. 6

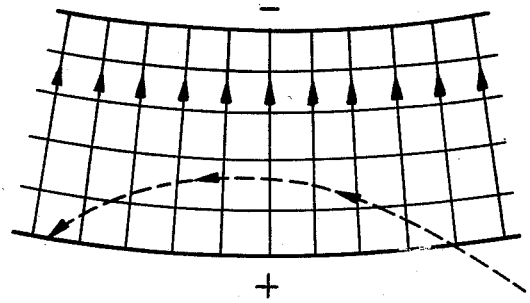
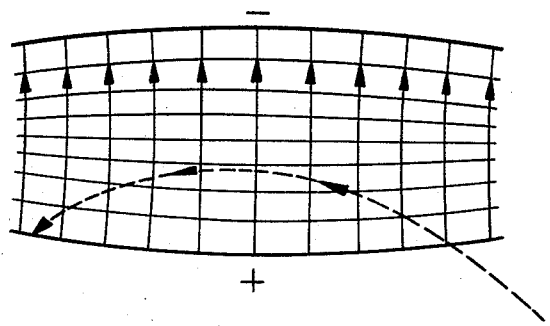
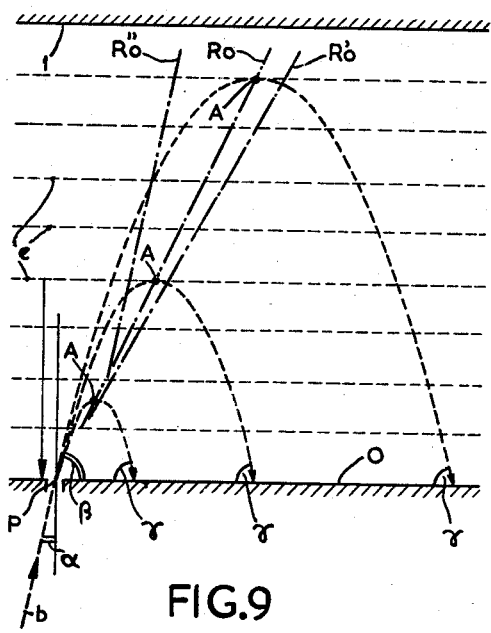
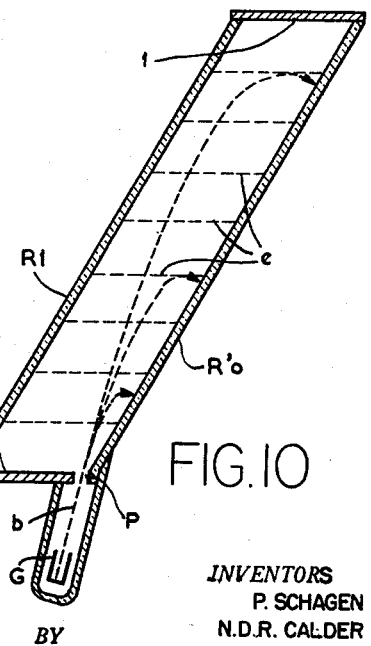

Sept. 12, 1961 P. SCHAGEN ET AL 2,999,957
CATHODE RAY TUBE

Filed July 24, 1957 12 Sheets-Sheet 4

INVENTORS
P. SCHAGEN
N.D.R. CALDER
BY
AGENT

Sept. 12, 1961  P. SCHAGEN ET AL  2,999,957
CATHODE RAY TUBE
Filed July 24, 1957  12 Sheets-Sheet 7
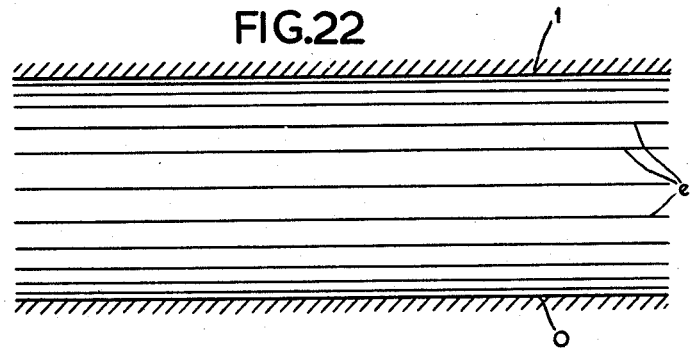
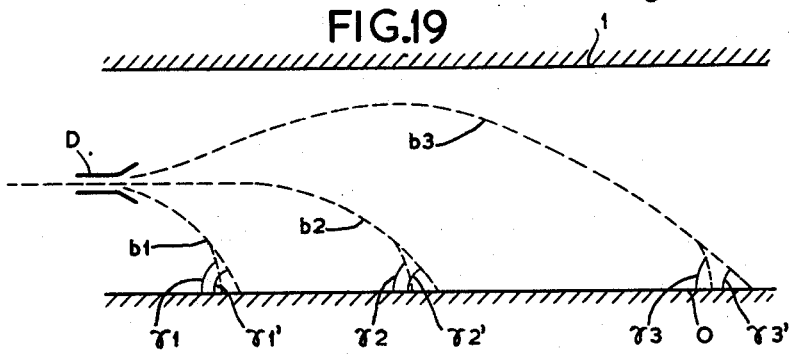
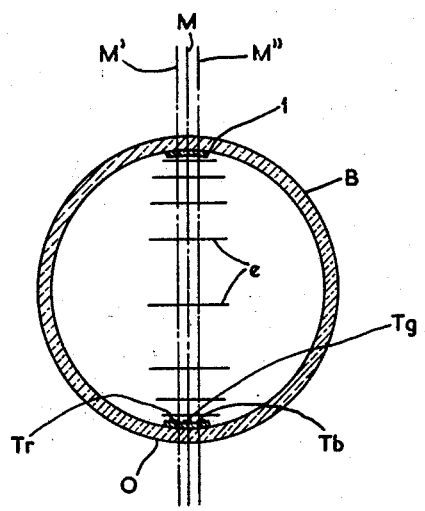
INVENTORS
P. SCHAGEN
N.D.R. CALDER
BY
AGENT Sept. 12, 1961  P. SCHAGEN ET AL  2,999,957
CATHODE RAY TUBE Filed July 24, 1957  12 Sheets-Sheet 10

INVENTORS
P. SCHAGEN
N.D.R. CALDER
BY
AGENT 2,999,957
CATHODE RAY TUBE
Pieter Schagen, Salfords, near Redhill, and Nigel David Ritchie Calder, Crawley, England, assignors to North American Philips Company, Inc., New York, N.Y.
Filed July 24, 1957, Ser. No. 673,790
Claims priority, application Great Britain Aug. 1, 1956
13 Claims. (Cl. 313—79)

This invention relates to cathode ray tubes for position-selecting, scanning and like operations and to apparatus comprising such tubes. Such apparatus may be applied for example to television display or camera systems, information storage devices, switching systems and generally where it is required to select from a plurality of positions or elements or to scan a plurality of positions or elements.

It is an object of the invention to provide tubes of this general character having a relatively small depth, i.e. a small dimension in the directions normal to a scanned or target surface.

According to one aspect of the invention a circuit comprises a cathode ray tube having an evacuated envelope containing a target, a repeller control electrode arranged alongside and spaced from said target and a second control electrode adjacent or close to said target and extending substantially along the full operative surface thereof. The circuit also comprises means for applying to said repeller and second electrodes differing potentials so as to set up an electric control field to cause the path of an electron beam to be bent towards said target with a controlled trajectory lying within an evacuated beam trajectory control space extending between said repeller electrode on the one hand and the combination of the target and the second electrode on the other hand. Means are provided for directing an electron beam into said trajectory control space from the region of one end or edge thereof in at least one trajectory plane, which plane intersects the operative surface of said target along a rectilinear or approximately rectilinear line of intersection, and including means for varying the beam trajectory in such manner as to vary the position of the point of impact of the beam along the operative surface of the target.

With such an arrangement the beam is directed into the trajectory control space with a velocity component parallel to the target or at least to the general direction of the latter. Moreover, with such a circuit the potentials, hereinafter referred to as control potentials, applied to the control electrodes (i.e. the repeller and second electrodes) are such that the control field is set up in the trajectory control space with a configuration such as to have a component repelling the electrons of the beam towards the target with a curved trajectory. The position of impact of the beam on the target electrode will depend on the velocity of the electrons, the intensity and configuration of the field and the direction of entry of the beam into the trajectory control space (also referred to, for brevity, as the "trajectory space"), and the means for varying the beam trajectory (and hence the point of impact) may operate by varying any one or more of these factors as will be explained.

The control electrodes may be conductive, i.e. conductive in the normal practical sense of relatively high or metallic conductivity or in the sense that a control potential applied to any part of an electrode will appear with the same value at all other parts of the electrode. In this connection, the expresion "conductive electrode" should be construed as covering also an electrode constructed in separate adjacent sections provided that the same control potential is applied to all sections. As an alternative to conductive control electrodes, resistive control electrodes may be used. In the case of a resistive electrode a potential difference is applied to opposite ends or edges thereof so as to set up a potential gradient therebetween. Such an electrode is resistive, as opposed to conductive, in the sense of having sufficient resistance to permit such gradient to be set up with a very small expenditure of power.

The means for directing an electron beam into the trajectory space may comprise an electron gun having its operative axis directed into said space from an end or edge portion thereof. Alternately, said means may comprise an electron gun located in a different manner but combined with deflection or mirror means (which may be external to the tube) for bending the beam from its initial direction into a path along which it can enter the trajectory space from an end or edge portion thereof, and an example of such an arrangement will be found in FIGURES 4 and 5 of the drawings.

The operative surface of the target is the surface over which it is possible to move the point of impact of the beam by varing the beam trajectory. The quality of the target will vary in accordance with the purpose of the apparatus. Thus, for information storage by electrostatic charge deposition, the target may be of glass with a metal backing constituting the second control electrode. On the other hand, in the case of a two-dimensional scanning device in accordance with the invention, the target may be a photo-electric mosaic if the device is to be used as a camera, a signal plate being provided therewith and constituting the second control electrode.

However, the invention is mainly concerned with devices in which the target is constituted by luminescent material. In such devices the second control electrode may itself be coated with luminescent material on its inner side or the electrode may be constituted by an electron-permeable conductive coating provided on the inner surface of a luminescent screen. The choice between these two alternatives depends to some extent on whether the light spot produced by impact of the beam is to be viewed from the inner or outer side of the target. However, in either event it is possible to treat the target and second control electrode as a single entity insofar as it acts to set up the control field; for this reason the description of the illustrated examples (all of which employ such targets) frequently refers to the second electrode as the "target electrode" for simplicity.

Although the illustrated examples employ such luminescent target arrangements, other arrangements are possible. Thus, for example, in a uni-dimensional scanning device the second electrode may be constituted by a pair of conductive strips separated by a narrow space within which a luminescent target strip is located; in such an arrangement the target strip will provide secondary emission in known manner and will thereby stabilize itself at the potential of the second electrode so as to act in combination with the latter to set up the control field. As a further example, the second electrode of a uni-dimensional device may be provided with a slit or a mesh structure along the locus of the points of impact so that the beam may emerge from the trajectory space to strike a luminescent screen spaced from the second electrode. In such an arrangement the luminescent target strip may again produce secondary emission so as to co-operate with the slotted second electrode in setting up the control field, or it may be associated with an additional accelerating electrode which co-operates with the second electrode; in either event, the trajectory control space should be taken as extending between the repeller electrode and the nearer element of the combination of second electrode and target.

The arrangement may permit the use of a large or infinite number of trajectory planes so that scanning or position-selection can be effected in two dimensions with the aid of a preliminary system for varying or selecting the operative trajectory plane. On the other hand, the circuit may employ an elongated tube suitable for uni-dimensional scanning or position selection along a line or a series of closely grouped parallel lines.

In either event it is convenient to consider the various methods of operation in relation to a given trajectory plane. The position of the point of impact of the beam may, if desired, be varied solely by varying the initial velocity of the electrons, but this method is disadvantageous in the case of display devices inasmuch as it becomes necessary to compensate for variations in brightness. Alternatively, the position of the point of impact may be controlled by varying the potentials applied to the control electrodes and, for a given beam velocity and direction of entry, such position can be determined by varying solely the potential, hereinafter referred to as the control potential, applied between the control electrodes. Thus, for example, a substantially linear scan may be obtained by varying the control field so as to vary the range of the trajectory end and thus cause the point of impact on the target to sweep a line on said target, and this action does not require any change in the initial electron velocity or direction.

As a further alternative, and according to a further aspect of the invention, a circuit comprises a cathode ray tube having an evacuated envelope containing a target, a repeller control electrode arranged alongside and spaced from said target and a second control electrode adjacent or close to said target, said circuit comprising also means including said repeller and second electrodes for setting up a control field to cause the path of an electron beam to be bent towards said target with a controlled trajectory lying within an evacuated beam trajectory control space extending between said repeller electrode on the one hand and the combination of the target and the second electrode on the other hand. It also includes means for directing an electron beam into said trajectory control space from the region of one end or edge thereof in at least one trajectory plane which plane intersects the operative surface of said target along a rectilinear or approximately rectilinear line of intersection, and means for varying the direction of entry of the beam in said plane over a range including directions away from the inner surface of said second electrode so as to vary the beam trajectory and thereby vary the position of the point of impact of the beam along the operative surface of the target.

Such means for varying the direction of entry of the beam may, if desired, be used in conjunction with means for varying the control field (in time), in which case one method of control may be employed to provide the main component of a scanning movement of the beam while the other method provides a linearity or other correction. However, if control of the point of impact is effected entirely by varying the direction of entry of the beam, then the control field configuration and intensity can be kept constant in time. Consequently, the field, being static, can be set up accurately and, as will be explained hereinafter, it can readily be given a non-uniform configuration such as to provide focussing additional to the initial focussing effected prior to entry of the beam into the trajectory space. In these circumstances the adjustment and setting up of the control field may include the provision of field components that are separately adjustable and may, if desired, be provided magnetically. In fact, more generally the static control field as a whole may be partly magnetic and partly electric.

Various types of cathode ray tubes may be employed depending on the nature of the circuit and the desired mode of operation.

Thus, according to a further object of the invention, a cathode ray tube comprises an elongated evacuated envelope containing an elongated luminescent target, a first elongated control electrode arranged alongside and spaced from said target, and a second elongated control electrode adjacent or close to said target and extending substantially along the full operative length thereof, said first and second electrodes lying generally in the direction of elongation of the envelope and being provided for controlling the trajectory of an electron beam within an evacuated beam trajectory control space extending between said first electrode on the one hand and the combination of the target and the second electrode on the other hand an electron gun is provided for directing an electron beam into said trajectory control space from the region of one end thereof with the effective gun axis in a plane which intersects the operative surface of said target along a rectilinear or approximately rectilinear line of intersection along the entire length of said operative surface, the gun having its effective axis directed substantially parallel to the operative surface of the target electrode or away from said surface at an acute angle thereto.

According to another aspect of the invention, a cathode ray tube comprises an elongated evacuated envelope containing an elongated luminescent target, a first elongated control electrode arranged alongside and spaced from said target and a second elongated control electrode adjacent or close to said target and extending substantially along the full operative length thereof, said first and second electrodes lying generally in the direction of elongation of the envelope and being provided for controlling the trajectory of an electron beam within an evacuated beam trajectory control space extending between said first electrode on the one hand and the combination of the target and the second electrode on the other hand. An electron gun is provided for directing an electron beam into said trajectory control space from the region of one end thereof with the effective gun axis in a plane which intersects the operative surface of said target along a rectilinear or approximately rectilinear line of intersection extending along the entire length of said operative surface, the gun having its effective axis directed substantially parallel to the operative surface of the target electrode or away from said surface at an acute angle thereto, and the configuration of said first and second electrodes being such that they are adapted, on application thereto of differing potentials, to set up in the region of said plane a beam trajectory control field having equipotential surfaces intersecting orthogonally or substantially orthogonally said plane throughout the area thereof extending between the said first and second electrodes.

Such elongated tubes are suitable for uni-dimensional scanning applications in which scanning is to be effected and displayed along a single line or along a small number of closely grouped parallel lines, a typical example of the latter applications being the use of a target constituted by three parallel phosphor strips of differing colour response for setting up one composite polychrome line of a colour-television raster. Such a monochrome or trichrome uni-dimensional tube may be used in a flying-spot scanner for film or in a television display system employing mechanical means for the frame scan.

Where variation of the direction of entry of the beam into the trajectory control space is to be effected as aforementioned, the cathode ray tube employed may, according to a further aspect of the invention, comprise an evacuated envelope containing a luminescent target, a first control electrode arranged alongside and spaced from said target and a second control electrode adjacent or close to said target and extending substantially over the full operative surface thereof, said first and second electrodes being provided for controlling the trajectory of an electron beam within an evacuated beam trajectory control space extending between said first electrode on the one hand and the combination of the target and the second electrode on the other hand, and an electron gun, the tube comprising or being combined with means for directing an electron beam into said trajectory control space from the region of one end thereof at a varying angle over a range including directions away from the inner surface of said second electrode in at least one plane which intersects the operative surface of said target along a rectilinear or approximately rectilinear line of intersection extending along the said operative surface. The configuration of said first and second electrodes is such that they are adapted, on application thereto of differing potentials, to set up in the region of said plane a beam trajectory control field having equipotential surfaces intersecting orthogonally or substantially orthogonally said plane throughout the area thereof extending between the said first and second electrodes and having a non-uniform distribution within said area. Such a tube may have a uni-dimensional form as exemplified hereinafter by the arrangements of FIGURE 17 and FIGURE 25 or it may have a two-dimensional form as exemplified by the arrangement of FIGURE 27. As for the means for directing the beam into the trajectory control space at a varying angle, such means may comprise electrostatic deflection plates contained within the envelope, or an external electromagnetic deflection coil system combined with the tube; in addition, such beam directing means may comprise internal or external beam bending means where the electron gun is not aligned with the beam deflection means, and an example of such additional beam bending means is provided by the electrode system 0—1—2 of FIGURE 27.

According to a further aspect of the invention, a cathode ray tube comprises an elongated evacuated envelope containing an elongated luminescent target, a first elongated control electrode arranged alongside and spaced from said target and a second elongated control electrode adjacent or close to said target and extending substantially along the full operative length thereof, said first and second electrodes lying generally in the direction of elongation of the envelope and being provided for controlling the trajectory of an electron beam within an evacuated beam trajectory control space extending between said first electrode on the one hand and the combination of the target and the second electrode on the other hand. An electron gun is provided for directing an electron beam into said trajectory control space from the region of one end thereof with the effective gun axis in a plane which intersects the operative surface of said target along a rectilinear or substantially rectilinear line of intersection extending along the entire length of said operative surface, the gun having its effective axis directed substantially parallel to the inner or operative surface of the second electrode or away from said surface at an acute angle thereto, and the inner or operative surface of said first and second electrodes being each generated by a rectilinear or substantially rectilinear generatrix with said generatrices parallel or substantially parallel to each other and to said plane. This definition of the shapes of the control electrodes is given in relation to their inner surface, i.e. those facing each other across the trajectory control space, since it is these surfaces that are operative to set up the control field in said space and determine the configuration thereof. The definition implies in effect substantially that each of such surface is plane or composed of a plurality of parallel plane surfaces (as exemplified by FIGURES 1, 10, 14 and 26) or is cylindrical or substantially cylindrical (as exemplified by FIGURES 11, 13 and 25) or partly plane and partly cylindrical. The term "cylindrical" is used herein to denote a surface generated by the motion of a rectilinear generatrix maintained at a constant orientation and having a normal cross-section constituted by a curved line; thus the term is not restricted solely to circular or elliptical cross-sections and includes part-cylindrical surfaces. In any event, the surfaces of the two electrodes can be regarded as generated by generatrices that are parallel to each other. This, however does not imply that the longitudinal edges of each electrode are parallel to each other; in fact they may be parallel as exemplified by FIGURES 11, 13 and 14 or non-parallel as exemplified by FIGURE 25.

According to another aspect of the invention, a cathode ray tube comprises an evacuated envelope containing a luminescent target, a first control electrode arranged alongside and spaced from said target and a second control electrode adjacent or close to said target and extending substantially over the full operative surface thereof, said first and second electrodes being provided for controlling the trajectory of an electron beam within an evacuated beam trajectory control space extending between said first electrode on the one hand and the combination of the target and the second electrode on the other hand. The tube comprises or is combined with means for directing an electron beam into said trajectory control space from the region of one end thereof in at least one plane which intersects the operative surface of said target along a rectilinear or approximately rectilinear line of intersection extending along said operative surface, each of said electrodes having an inner or operative surface which is plane or substantially plane and parallel or substantially parallel to the inner surface of the other electrode, and spaced therefrom at a distance which is smaller than the largest dimension of either electrode. Such tubes may be elongated if required for uni-dimensional scanning purposes (as exemplified by the uni-dimensional versions of the arangements of FIGURES 1, 10 and 26) or they may have electrodes extending approximately equally in two dimensions so as to permit two-dimensional scanning as exemplified by FIGURES 2 to 6 and FIGURE 27.

As has been mentioned previously, non-uniform control field configurations can be set up in such manner as to provide focussing additional to the initial beam focussing. In this connection although the conditions appertaining to a parallel beam will be discussed for convenience with reference to various examples, it will be understood that space-charge effects render it unpracticable to use parallel beams with the relatively heavy beam currents required for display purposes; thus in all the illustrated examples it should be assumed that initial focussing is applied to the beam before its entry into the trajectory control space so that in fact the beam will be a convergent one at the point of entry, and the focussing effects due to the non-uniform configuration of the control field are additional to such initial focussing.

Such additional focussing by the control field can be obtained readily when a static control field is employed in conjunction with means for varying the direction of entry of the beam into the trajectory space. However, favourable results can also be obtained with arrangements employing variation of the control field (in time) to vary the trajectory. In either event, the non-uniformity of the field configuration can be arranged to provide focussing additional to that effected before entry of the beam into the trajectory space. By employing such additional focussing in a given direction in a region nearer to the target than the initial focussing means, a smaller corresponding dimension of the spot can be obtained than with initial focussing alone since, in optical terminology, this corresponds to a reduction in the ratio between the image distance and object distance (such distances being referred to an equivalent converging lens located between an object representing the beam crossover near the cathode and an image representing the spot). Such change in ratio reduces the magnification of the object.

Moreover, such delaying of a part of the total focussing action reduces the expansion of the beam due to space-charge effects.

If, as in the illustrated examples, the additional focussing is applied only in the direction of the trajectory plane or in the direction normal thereto, or to an unequal extent in the two directions, then the initial focussing required will be astigmatic as well as dynamic if the smallest spot is to be obtained at all ranges.

The control field configuration may be rendered non-uniform in various ways so as to provide the additional focussing. Thus, for example, with tubes employing cylindrical control electrodes as aforesaid, it is possible to provide an electric control field configuration in which the field strength increases away from the target as exemplified by FIGURES 13 and 15, the focussing effect being in the trajectory plane. Further cylindrical electrode arrangements can provide more complex field configurations as exemplified by FIGURE 25 which involves longitudinal variation of the field strength. Non-uniform field configurations can also be obtained by using resistive control electrodes e.g. as described with reference to FIGURES 26 and 27 in which the field strength increases away from the gun so as to provide focussing in the trajectory plane. Moreover, it is possible to use control electrodes that are both cylindrical in form and resistive in nature. Apart from non-uniformity in a given trajectory plane, there may be non-uniformity in spaces adjacent thereto occupied by the volume of the beam, and a valuable example is provided by curvature of the equipotential surfaces in the region of an elongated target as described e.g. with reference to FIGURE 23, such curvature being convex as viewed from the repeller electrode and providing focussing in the direction normal to the trajectory plane.

The focussing effects of these various non-uniform configurations will be described with reference to the drawings, but it will be observed at this stage that such effects can provide a small spot at a selected range (which may be the maximum range) even with the relatively heavy beam currents required in display applications and therefore make it possible for a small spot to be obtained at all ranges with the aid of the aforesaid dynamic focussing applied to the beam before its entry into the control field. The additional focussing action of the trajectory control field may operate in the direction of the trajectory plane or in the direction normal thereto as aforementioned, or in both directions, and action in a given direction will vary with changes in trajectory and range; in some examples this variation will be in such sense as to reduce the amount of dynamic focussing required in the respective direction; in other examples such variation occurs in such sense as to actually increase the amount of dynamic focussing required, but a favourable result is obtained nevertheless in that the combination of non-uniform control field configuration with dynamic focussing maintains the spot all along the target within smaller dimensions that would be possible for the same beam current with either the same control field configuration or dynamic focussing taken separately.

The latter point can be illustrated by some examples. Thus in FIGURE 18 the variation in the additional focussing action occurs in the right sense from the point of view of reducing the amount of dynamic focussing required, the condition of the beam at $b2$ presenting a greater degree of longitudinal focussing than the beam in the condition $b1$; this applies when the direction of entry of the beam is constant and control of the trajectory is effected by variation of the control potential. On the other hand, if a field configuration such as that of FIGURES 13 and 15 is used with a static control potential and control of the trajectory by variation of the direction of entry of the beam (e.g. as in FIGURE 17), then the additional focussing action provided by the control field is greatest at the longest range owing to the fact that the beam passes through the strongest part of the field when deflected away from the target, and in these circumstances a greater amount of initial dynamic focussing is required. Turning to the example of FIGURE 26, focussing in the direction of the or each trajectory plane is provided by non-uniform configuration of the control field; if the arrangement is used with a constant direction of entry of the beam and variation of the control potential or potentials, then the longitudinal focussing varies in such sense as to reduce the amount of initial dynamic focussing required; on the other hand, if a static control field is used with deflection of the beam at its point of entry, then the longitudinal focussing provided by the control field varies in such sense as to require a greater amount of initial dynamic focussing in the direction of the trajectory plane. As a further example, a configuration providing increase in field strength near the target and uniformly distributed along the latter (e.g. as in FIGURES 21 and 22) will in itself provide a degree of defocussing of the beam; however, this condition can be more than compensated if it is accompanied (as in FIGURE 23) by appropriate curvature of the control field configuration (convex as viewed from the repeller electrode) and the consequent additional focussing provided by the control field in the direction normal to the trajectory plane.

In certain cases involving material changes in the shape of the spot with changes of its position along the target, it is possible to assist the dynamic focussing by setting up the beam initially with an oval cross-section instead of a round or symmetrical cross-section.

In the illustrated examples the luminescent target and the second electrode present together a substantially continuous surface as viewed from the repeller electrode. Although the control electrodes are shown in some examples as having a finite thickness, it will in fact be appreciated that this has been done for clarity and does not imply anything as regards the true thickness of the outer non-operative surfaces of the electrodes, and similarly when an electrode is referred to as being "plane" or "cylindrical" it will be appreciated that it is the inner or operative surface of such electrode that is relevant and is being referred to. Thus one of the electrodes may in fact be constituted by a lining or layer on the inner surface of the envelope wall, and such lining may for example be a transparent coating of tin oxide. Moreover, the fact that a luminescent screen or strip has been indicated in some of the drawings on the inner face of the second electrode should only be taken as a schematic representation since the examples include also the case in which the second electrode is a thin coating on the inner side of the phosphor. As regards the elongated tubes illustrated, the schematic form of the drawings should be held to include also the case where the second electrode has a slit within which the operative part of the phosphor target is located, the result being once more a continuous or substantially continuous inner surface presented by the combination of the second electrode and target.

Specific embodiments of the invention will now be described with reference to the accompanying drawings as applied principally to scanning systems.

FIGURES 1 to 10 of the drawings illustrate arrangements in which a uniform control field configuration is set up by plane parallel electrodes, such uniform configuration extending on either side of any given trajectory plane; in these drawings FIGURES 2 to 6 illustrate two-dimensional systems employing conductive control electrodes while FIGURE 10 shows an arrangement employing resistive electrodes.

FIGURE 11 of the accompanying drawings shows an elongated arrangement providing a uniform control field configuration along a median plane constituting the trajectory plane.

FIGURE 12 of the accompanying drawings shows a cylindrical envelope layout for uni-dimensional scanning tubes.

FIGURES 13 to 18 of the accompanying drawings illustrate uni-dimensional arrangements employing conductive electrodes in which the field strength increases away from the target and thus provides additional focussing of the beam in the direction of the trajectory plane.

FIGURES 19 to 25 of the accompanying drawings illustrate further arrangements employing conductive control electrodes; FIGURES 20 to 24 illustrate arrangements employing a parallel control field configuration with field strength increasing towards the repeller electrode in order to provide additional focussing in the direction of the trajectory plane; the arrangement of FIGURE 23 provides also a curved field configuration near the target in order to provide additional focussing in the direction normal to the trajectory plane, and FIGURE 25 illustrates an arrangement in which the field strength varies both along the target and in a direction normal thereto.

FIGURES 26 and 27 of the accompanying drawings illustrate arrangements employing a resistive repeller electrode with a potential applied between its ends and a conductive second electrode, the field strength increasing away from the gun so as to provide additional focussing in the direction of any given trajectory plane; FIGURE 27 represents a two-dimensional variant of this arrangement combined with an initial scanning arrangement similar to that employed in the two-dimensional arrangement of FIGURES 2 and 3.

FIGURE 28 of the accompanying drawings is a cross-section of a further two-dimensional arrangement in which the target is of cylindrical form, FIGURE 29 being a longitudinal section thereof.

Specific two-dimensional arrangements will now be described by way of example with reference to FIGURES 2 to 6 of the accompanying drawings as applied to the particular two-dimensional requirement of line and frame scans for a raster such as is used for example in a television display system.

First, however, a further explanation of the parabolic-trajectory mode of operation will be given with reference to FIGURE 1 of the drawings as applied to a unidimensional system.

Figure 1:
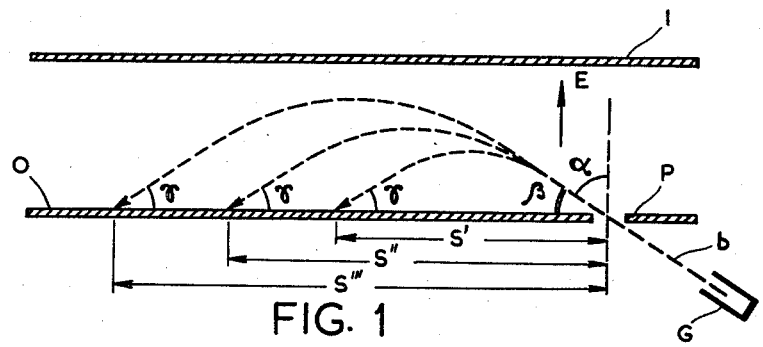

Referring to FIGURE 1, the simple arrangement shown permits scanning in one dimension as may be required for example in special television display systems for films.

The trajectory control space (or, more briefly, the trajectory space) extends between a pair of elongated parallel rectangular conductive control electrodes 0 and 1. The electrode 0 acts as a target electrode and may carry a phosphor coating for displaying the spot. Electrode 1 acts as a repeller electrode. Electrode 0 is provided with an aperture P for the entry of a beam $b$ emitted by an electron gun G. The electrodes 0 and 1 are shown extended beyond the entrance aperture P in order to minimise or eliminate edge effects which might otherwise cause distortion of the uniform control field within the trajectory space. In a similar manner the range of the beam (indicated by S', S'', S''' in the drawing) has its maximum limited so that the point of impact remains some distance inwards of the ends of the electrodes 0 and 1.

The potentials of electrodes 0 and 1 with respect to the cathode of the gun G (which cathode may be grounded) will be referred to as $V_0$ and $V_1$ respectively.

The beam $b$ consists of electrons of energy $eV_0$ and enters the opposing or repelling field E at an acute angle $\alpha$ to the lines of force i.e. at a complementary acute angle $\beta$ to the equipotential surfaces.

Since the inner or operative surfaces of electrodes 0—1 are plane, there is a family of planes intersecting the target electrode 0 orthogonally throughout its length. The direction of entry of the beam lies in a trajectory plane which is a selected one of said family of planes. If desired, two or more electron guns may be arranged so as to employ parallel trajectory planes associated with parallel phosphor or other target strips laid on the target electrode 0. Moreover, whereas no means have been described hitherto for affecting deflection or displacement of the electron beam in a direction transverse to the trajectory plane prior to its passage through the trajectory space, such means may be used in particular cases. Thus, for example, for colour television display, a unidimensional line scan may be displayed laterally so as to effect switching between three parallel phosphor strips of differing colour response. In either event, inwardly directed flanges may be provided on the longitudinal edges of the control electrodes 0—1 so as to reduce edge effects and permit the width of the tube (in the direction normal to the drawing) to be reduced while maintaining the control field configuration planar in the region of all the operative trajectory planes.

On the other hand, if only one trajectory plane is used, then it may be sufficient for the equipotential surfaces to intersect said plane along equally spaced lines of intersection, without the need for such surfaces to be planes. An example employing cylindrical control electrodes will be described with reference to FIGURE 11 but, since the consequent curvature of the field introduces further considerations with regard to focussing, it is convenient to revert to the general case of a uniform field having plane parallel equipotential surfaces.

If, in an ideal case, the electrodes are accurately planar and parallel and are of substantially equal area, and if edge effects are negligible within the operative trajectory space, then the equipotential surfaces are uniformly spaced planes parallel to the electrodes. In these circumstances the trajectory of the beam will be a true parabola for any given control potential and, since the direction and angle $\beta$ of entry is constant and target 0 passes through the origin P, the angle of impact $\gamma$ on the target electrode will be equal to $\beta$ for all parabolic paths. The parabolic trajectory has a range S which depends on the field intensity B (determined by the potentials $V_0$ and $V_1$ of electrodes 0 and 1) and the potential $V_0$ in accordance with the formula:

(0) $$S = 2\frac{V_0}{B} \sin 2\beta$$

By varying the potential $V_1$, and hence B, with time a linear scan can be achieved at constant electron energy and constant angle of impact $\gamma$ on the target electrode. Because B is inversely proportional to S, the smaller the minimum range the greater is the control voltage swing needed to scan a line of given length.

Since the electric control field of FIGURE 1 has a uniform configuration consisting of parallel plane equipotential surfaces, the arrangement lends itself readily to extension to operation in two dimensions. For this purpose the control electrodes may be extended in the direction normal to the drawings of FIGURE 1 until they are no longer elongated in the direction of the beam trajectory. At the same time means are provided for displacing the beam trajectory in the direction normal to the drawing. Such means may be constituted by a magnetic line-scanning system. Alternatively they may comprise means for applying orthodox angular deflection to the beam prior to its entry into the control space (cfr. FIGURE 6 below) and may comprise also a collimating device for rendering all the beam paths parallel before entry into the control space (cfr. FIGURES 4 and 5 below). First, however, a two-dimensional system will be described which employs a preliminary system corresponding to the arrangement of FIGURE 1 with its target electrode 0 replaced by an electrode having a longitudinal slit to allow passage of the beam from the first trajectory space to the two-dimensional trajectory space. The choice of such an arrangement is advantageous inasmuch as it can direct the beam through the slit at a substantially constant angle γ at all points along the slit. With this arrangement the aperture P can become a slit along which the position of entry of the beam can be varied. An example of such a two-dimensional scanning means will now be described with reference to FIGURES 2 and 3.

Figures 2, 3:
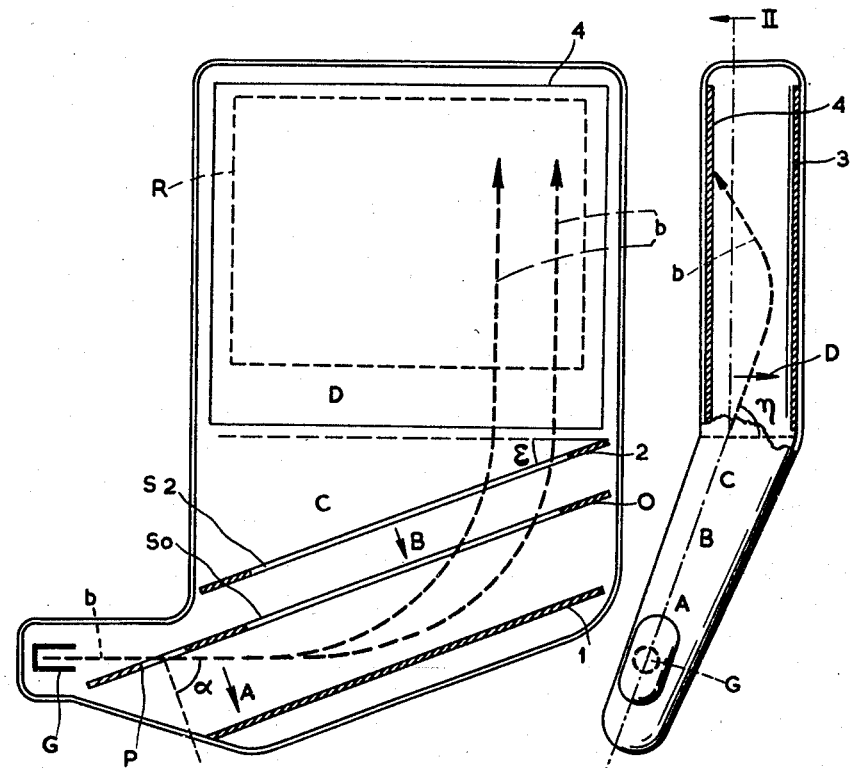

FIGURES 2 and 3 show diagrammatically a sectional rear elevation and part-sectioned end view respectively of a display system suitable for a television receiver or the like, FIGURE 2 being a section taken along the line II—II of FIGURE 3. Specific voltages and angles are given by way of example to assist understanding of the description.

From a gun G, a beam b of electrons enters, through a hole P, into a first trajectory space between control electrodes 0 and 1. The beam enters at an angle α of, say, 70° to the lines of force of the control field A set up by electrodes 0 and 1.

The cathode of gun G may be grounded, and the electrode 0 and the final anode of the gun may both be at a constant D.C. potential $V_0$ of, say, 5 kv. with respect to said cathode so that the energy of the electrons on entry at P is 5 kev. The field A is determined by the potential $V_1$ of control electrode 1 and the latter may be varied with a sawtooth waveform between say 1.2 and 4.3 kv. to effect a line scan along the operative length of a slit $S_0$ provided in the second control electrode 0. Thus by varying the voltage on the electrode 1 the beam is constrained to emerge through this slit at a certain rate and at a constant orientation equal to the angle as shown in FIG. 1.

The beam then enters a uniform accelerating field B of substantially uniform and constant intensity set up by a planar electrode 2 held at a D.C. potential $V_2$ of, say, 15 kv. (with respect to the cathode) and arranged parallel to electrodes 0 and 1. The beam is deflected by field B through a constant angle of 42° and, since its angle of entry into the space of field B is constant, its angle of exit is also constant.

The beam emerges through a further slit $S_2$ in the electrode 2 into a triangular field-free space C. This space has a apex angle ε of 28° to ensure that the beam travels parallel to the side edges of the picture screen R (the latter are vertical when the gun axis is positioned horizontally).

The beam then enters a substantially uniform field in space D at an angle n (FIGURE 3) of e.g. 70° to the lines of force. The plane of the beam in the chambers containing fields A, B and C is therefore tilted by 20° with respect to the parallel control electrodes 3 and 4 which set up a control field D, as will be seen from FIGURE 3. The frame scan is generated by variations of the potential $V_3$ of the repeller electrode 3 between say 6.3 and 9.8 kv., the final target electrode 4 (which is in contact with a layer of phosphor R constituting a picture screen) remaining at a potential $V_4$ equal to the potential $V_2$ of 15 kv.

The chief disadvantage of this tube is its size. For a 21″ picture, it may just fit inside a square of 28″, and to oppose the atmospheric pressure on so large a surface area, a very robust construction is needed. Moreover, with such a picture size the beam path length ranges up to about one metre, and the focussing problems are considerable.

A further two dimensional scanning and display arrangement suitable for television and like purposes permitting smaller over-all dimensions for a given picture size will now be described with reference to FIGURES 4 and 5 showing respectively a sectional rear elevation and a vertical section taken along the line V—V of FIGURE 4.

From a gun G a beam b of, say 15 kev. electrons in a field-free space passes through line deflection means (which may be magnetic although shown as electrostatic deflection plates L) which sweep it across a curved electron mirror M. This mirror serves three purposes:

(1) It rotates the beam through about 200°.
(2) It displaces the beam from the rearward field-free space towards a screen formed on target electrode 0.
(3) It renders all the reflected beam paths parallel.

The beam then enters the opposing control field A between electrodes 0 and 1 e.g. at an angle of 70° to the lines of force (i.e. an angle β of 20° to electrode 0). The target electrode 0 (with the picture screen) is maintained at 15 kv., and by varying the voltage on the electrode 1 the frame scan is generated. Screening between the rear space and the front trajectory control space is effected with the aid of a plate electrode 5.

For a 21″ picture an envelope about 18″ square and 3″ deep can be used. As will be appreciated, the electrostatic deflection means L may be replaced by magnetic deflection means.

FIGURE 6 is a diagrammatic front perspective view of a tube comprising a generally rectangular envelope with an inclined neck mounting a gun G. The front wall of the envelope carries the control electrode 0 in combination with a phosphor target or screen, while the rear wall carries repeller control electrode 1.

The gun axis may be at an angle of, say, 20° to the electrode 0 and the front-to-back depth of the envelope may be relatively small as in FIGURES 2 to 5.

Conventional deflection means D (which may be electrostatic, as shown, or magnetic) deflect the beam before it enters the trajectory space (between electrodes 0 and 1) through a slit $Sp$ in electrode 0. Preferably the line scan is effected by means D since, as in the arrangement of FIGURES 4–5, this leaves the high-voltage control electrodes 0–1 to operate at the low frequency of the frame scan.

After entry through slit $Sp$ (at a varying horizontal deflection angle), the beam is opposed by electrode 1 and returned forwardly to the display screen at a height determined by the progress of the frame scan waveform. However, a given voltage $V_1$ of electrode 1 will cause means D to scan the beam along a horizontal raster line such as h which will be curved unless a correction is made. This may be done by superimposing a small correction component at line frequency on to the frame scan waveform of electrode 1, but preferably ancillary deflection means are provided to give a linearising correction by acting on the beam in a direction normal to the action of means D. In addition, distortion of trapezium type arises, but this can be corrected in known manner by varying the deflection angle applied by means D.

In the description of the arrangements of FIGURES 1 to 6 it has been assumed that the control electrodes 0–1 are truly planar. However, said electrodes may be curved. Thus in the case of a uni-dimensional or line-scan tube they may be cylindrical e.g. as described with reference to FIGURE 11. On the other hand, in the case of two-dimensional electrode systems such as those of FIGURES 2 to 6, the control electrodes may be slightly curved, in which case they are still maintained substantially or approximately parallel, and they are so arranged as to set up a field having equipotential surfaces substantially or approximately parallel to each other and to the electrodes. In such an arrangement the beam trajectories are transformed parabolae or are only approximately parabolic, and the angle of impact on the target is not quite constant. Such arrangements may be advantageous for two-dimensional devices in that the target electrode can be located, together with a phosphor screen, on an actual wall of the envelope which was slightly convex to the exterior to withstand atmospheric pressure. Two examples are shown schematically in FIGURES 7 and 8, the electrodes 0–1 of FIGURE 7 having curvature in the same direction while those of FIGURE 8 are curved in the opposite directions and are both externally convex. In the case of FIGURE 7 the equipotential surfaces e are parallel in the sense that the spacing between any two of them is substantially constant, and they are slightly crowded towards the smaller electrode 1. On the other hand, the equipotential surfaces $e$ of FIGURE 8 are only approximately parallel but they are not crowded towards either electrode (however there is slight crowding of the lines of force towards the ends). The electrode curvatures shown may apply in two dimensions so that the electrodes have a dished form which may, for example, be part-spherical. Alternatively, the curvature shown may apply only in one direction, in which case the electrodes have part-cylindrical forms. The latter arrangement may be preferable for a two-dimensional scanning device for producing a raster: in fact the problems of raster distortion due to screen curvature can thus be reduced for a small loss in the inherent rigidity of the envelope wall carrying the display screen with target electrode 0.

It is now convenient to consider more broadly the theory of the parabolic-trajectory mode of operation, and this will be done with the aid of the diagram of FIGURE 9 in which planar control electrodes of indefinite extent are indicated at 0 and 1, with a beam $b$ entering at P with an angle $\alpha$ to the lines of force and an agle $\beta$ to the electrode 0.

If the target surface coincides with the surface of electrode 0, as in previous examples, then a degree of automatic longitudinal focussing occurs with respect to electrons which diverge at the point of entry P. Such effect is due to the geometry of the parabolic paths and would provide maximum results with angles $\alpha$ and $\beta$ of 45°. This is due to the fact that, according to well known principles, 45° is the angle which gives maximum range along the surface of electrode 0; consequently, the paths of electrons having an angle $\beta$ slightly greater than 45° will have a range slightly shorter than the maximum range and will thus have points of impact in the same target region as electrons with an angle of entry B slightly smaller than 45°.

On the other hand, electrons pursuing spaced parallel paths within the beam tend to be closest at the apex A of any given parabola since at or near that point their paths cross over. Thus a line $R_0$ passing through the apices of all the parabolae represents a locus of optimum automatic focussing for parallel electrons.

According to a modification of the arrangement shown in FIGURE 1, a target distinct from conductive control electrode 0 may be located in the position $R_0$, or at some orientation intermediate between position $R_0$ and 0, provided that said target is of an electrically resistive nature and is electrically connected between conductive control electrodes 0 and 1 so as to act as a potential divider therebetween. In fact, if the resistance of $R_0$ is uniform, such an arrangement will allow the uniform field pattern to remain undisturbed in the trajectory space extending between electrodes 0—1 and target $R_0$, and the portions of electrodes 0 and 1 extending beyond target $R_0$ will become redundant. The orientation of $R_0$ can be chosen so as to afford a compromise between the focussing conditions of divergent and parallel electrons and the point of entry P may, if desired, be at the junction between 0 and $R_0$ or in the target $R_0$ itself. The target may alternatively be given a position such as $R''_0$ parallel to the direction of entry of the beam, but the angle of incidence of the beam on the target will vary considerably.

The size of the device may be reduced by connecting electrodes 0—1 by a further resistive electrode located on the side of the trajectories remote from target $R_0$ and preferably parallel to $R_0$ so as to enclose a trajectory space having a cross-section in the form of a parallelogram. As in the case of target $R_0$, this further resistive electrode does not change the field distribution if it is of uniform resistivity.

An example of such a modified arrangement will now be described with reference to FIGURE 10.

The plane of the resistive target $R'_0$ passes near the apices A of the parabolae in a position of $R'_0$ (cfr. FIGURE 9) where it cuts the parabolae at right angles, the resultant normal incidence of the beam providing an advantageous compromise as regards the longitudinal focussing requirements. The second resistive planar electrode $R_1$ is parallel to target $R'_0$. The beam enters at P with energy $eV_0$ and the neck containing gun G has its axis parallel to surface $R'_0$—$R_1$ and therefore parallel to a phosphor screen laid on target $R'_0$. Thus considerable overall compactness is achieved in the direction normal to the screen in spite of the fact that the angle $\beta$ (FIGURE 9) is greater than the corresponding angle in the arrangement of FIGURE 1. $R'_0$ and $R_1$ have uniform resistive surfaces so as to set up a uniform potential gradient with planar equipotential surfaces $e$ parallel to the vestigial conductive control electrodes 0—1. Scanning can be effected along the target $R'_0$ merely by varying the potential $V_1$ of control electrode 1.

The arrangement of FIGURE 10 may be made narrow (in the direction normal to the drawing) and elongated for line-scanning purposes, e.g. for a monochrome line or for a triple tricolour line for colour television display as explained with reference to FIGURE 1. Alternatively, the plane electrode $R'_0$—$R_1$ may be extended in the direction normal to the drawing so as to permit a raster to be formed on target electrode $R'_0$, preliminary line-scan means being provided for displacing laterally the plane of the beam trajectory as described with reference to FIGURES 2 to 6. In either event, the trajectory space may be confined, at its sides, by further resistive surfaces extending between the edges of electrodes $R'_0$ and $R_1$ and connected to electrodes 1 and 0. This can provide a greater degree of compactness by eliminating edge effects and, at the same time, removes the problem of the accumulation of electrostatic changes on glass parts of the tube wall. However, apart from the latter problem, the tube can operate without any surfaces connecting electrodes $R'_0$ and $R_1$, it being sufficient to replace electrodes 0—1 by conductive edges provided along the ends of electrodes $R'_0$—$R_1$ (i.e. their edges which lie normal to the drawing) together with a conductive connection between each pair of conductive edges; of course, such an arrangement will give rise to edge effects and it is desirable to confine the operative or scanned part of the target so as to avoid the edge areas where the planar field configuration becomes distorted.

Reverting to uni-dimensional or line-scan versions of the arrangement of FIGURE 1, it has already been mentioned that the control electrodes may be cylindrical if the system employs only one trajectory plane or, at most, two or more parallel trajectory planes grouped close together in a central region. An example of such an arrangement is shown in cross-section in FIGURE 11, where the conductive control electrodes 0—1 are of right-cylindrical form while the equipotential surfaces $e$ have varying cylindrical forms. Said surfaces intersect the median trajectory plane M at substantially equidistant parallel lines of intersection I. This example illustrates the possibility of having a field configuration which is uniform in the region of an individual trajectory plane and orthogonal thereto while being non-uniform in the direction normal to said plane. It may be desirable to arrange the electrodes of FIGURE 11 on the inner surface of a right-cylindrical envelope, in which case there is the advantage that the envelope is readily suited to withstand atmospheric pressure. The target may be constituted by a phosphor strip laid on the target electrode 0 and indicated at $p$. Although the arrangement of FIGURE 1 permits scanning to be obtained by varying the angle of entry $\beta$ of the beam into the trajectory control space by means of a preliminary deflection system, this arrangement has been described as employing a constant angle of entry $\beta$ (with variation of the control potential in time for effecting the scan).

This renders the electrode arrangement suitable for use as the first stage of a two-dimensional system such as that of FIGURES 2-3 since it permits operation at a substantially constant angle of impact. However, if it is not important to have a constant angle of impact and if dynamic means are introduced for varying initially the focus conditions in such a manner as to compensate for variations in the length of trajectory so as to obtain a small spot dimension in the direction of scan, then variation of said angle of entry can be used with good results as an alternative to variation of the control field in time. This is the case with the uni-dimensional line-scan arrangements described with reference to FIGURES 12 to 25 of the accompanying diagrammatic drawings wherein non-uniform control fields are provided to effect a degree of additional focussing.

Such arrangements are suitable for scanning in one dimension as may be required for example in special television display systems or in flying-spot scanners for films. Accordingly, these examples are described as having a target constituted by a luminescent phosphor strip.

In the arrangements of FIGURES 12 to 24 the two conductive control electrodes have parallel generatrices and parallel sides, the resulting field configuration having equipotential surfaces of cylindrical form which also have parallel generatrices. Such surfaces intersect orthogonally a median trajectory plane, and at such plane the field strength of the control field varies in a direction normal to the target.

Figure 25:
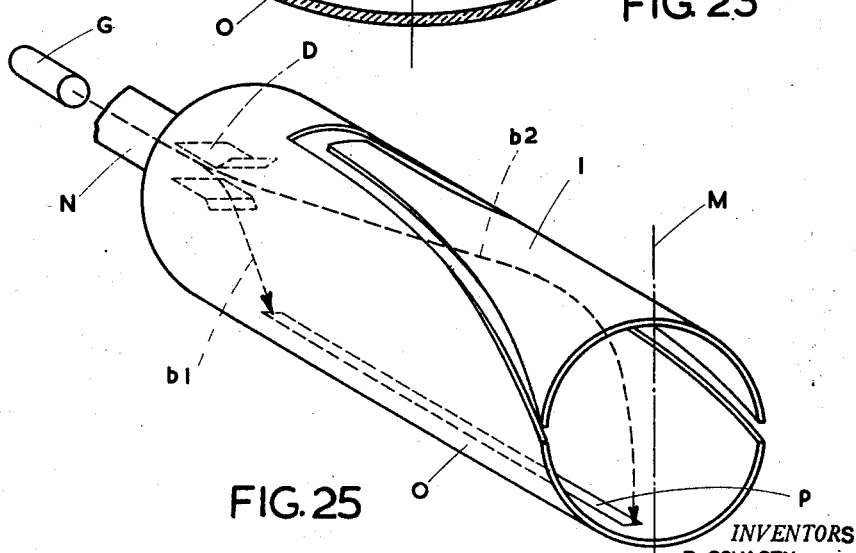

On the other hand the control electrodes of FIGURE 25, although having surfaces generated by parallel generatrices, have edges which are not parallel and the resultant control configuration has a field strength which varies in a direction parallel to the phosphor target as well as in a direction normal thereto.

Figure 12:
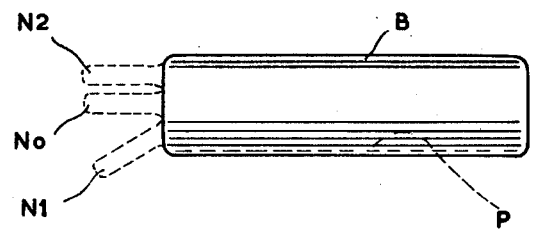

Referring now to FIGURE 12, the arrangement shown illustrates in an introductory manner some possible envelope constructions for the line-scan electrode arrangements of FIGURES 13 to 25 and it will be appreciated that the cylindrical form of the bulb B shown is convenient but not essential. Three possible positions of the neck comprising the electron gun are shown respectively at N0, N1 and N2, and the location of the phosphor target strip is indicated at $p$.

Figure 13:
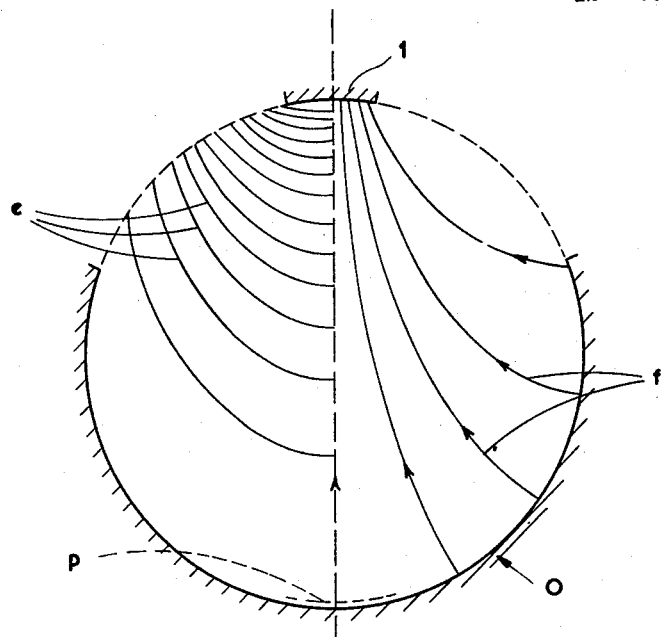
Figure 14:
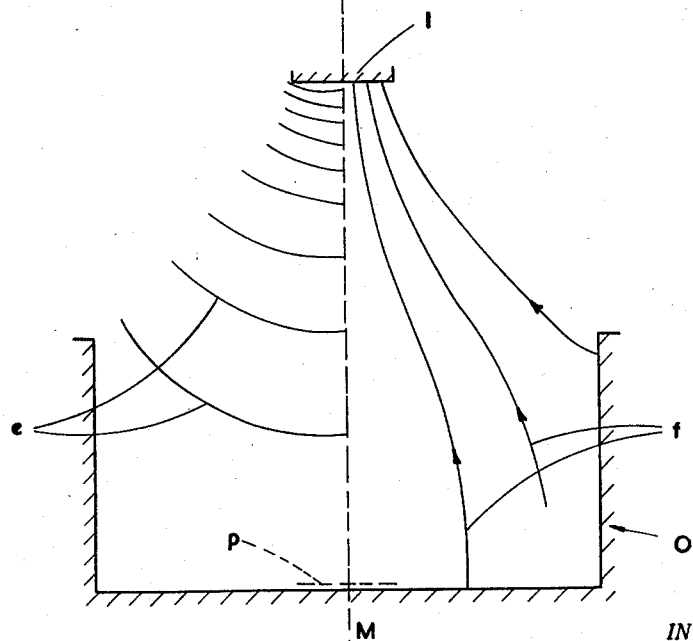

FIGURES 13 and 14 are cross-sections of two electrode configurations adapted to provide similar control field configurations in a median plane.

In each case the trajectory space extends between a pair of elongated parallel control electrodes 0 and 1. The electrode 0 acts as target electrode and may carry a target constituted by a phosphor strip $p$ for displaying the spot.

The control field is represented by equipotential surface $e$ and lines of force $f$.

Figure 15:
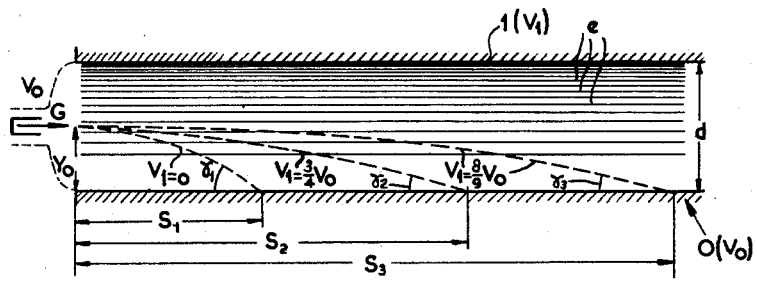

FIGURE 15 is a longitudinal section of the electrode arrangement of FIGURE 13 or FIGURE 14 taken along the median plane of symmetry M and shows an electron gun G for directing a beam into the control field along the plane M, which constitutes a trajectory plane, in a direction parallel to the equipotential surfaces. Part of the neck of the tube is shown schematically (not to scale) and the reference $V_0$ applied to the adjacent end portion of the bulb signifies that such portion is preferably provided with a conductive coating connected to electrode 0 (but not, of course, to electrode 1).

The parallel lines of intersection ($e$ in FIGURE 15) between the plane M and the equipotential surface may be spaced according to a quadratic law, so that at a distance $y$ from the target electrode, in the plane M, the potential $V_y$ is given by the equation:

(1) $$V_y = V_0 - (V_0 - V_1)\frac{y^2}{d^2}$$

where $d$ is the separation of the electrodes in the plane M and $V_0 - V_1$ are the potentials of electrodes 0 and 1 respectively. In such conditions any beam trajectory in the plane M will be part of a truly sinusoidal curve and an electron entering parallel to the target electrode 0 (as shown in FIGURE 15) will have a range S which depends on the potential $V_0$ of electrode 0 and potential $V_1$ of electrode 1 (with respect to the cathode of the gun G, which may be grounded) in accordance with the formula:

(2) $$S = \frac{\pi d}{2}\sqrt{\frac{V_0}{V_0 - V_1} - \frac{y_0^2}{d^2}}$$

where $y_0$ is the distance of the point of entry from the target measured in the plane M. Three trajectories are shown in FIGURE 14 and correspond to repeller electrode potentials of zero (cathode), ¾ $V_0$ and ⅝ $V_0$ respectively.

Figure 18:
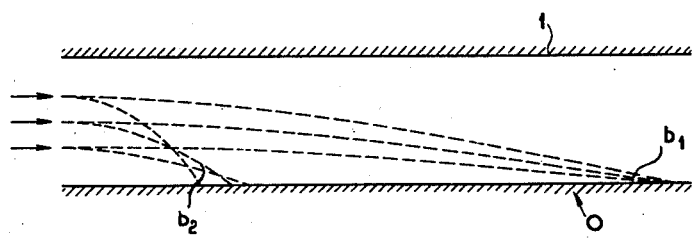

Neglecting space-charge effects, this formula shows that the approach to perfect focussing for a parallel beam is made as the term (3) $$\frac{V_0}{V_0 - V_1}$$

becomes large in comparison with the term $y_0\,2/d^2$ so that the range S tends to become the same for electrons entering on parallel paths at differing heights $y_0$ as illustrated at $b1$ in FIGURE 18. Thus longitudinal focussing of a parallel beam actually improves as potential $V_0$ approaches $V_1$ and the range increases. At the shorter ranges corresponding to more negative values of $V_1$, the range of an individual electron is less the greater the value of its distance $y_0$, so that over-convergence occurs as is shown at $b2$ in FIGURE 18.

The qualitative explanation of this effect is that the electrons close to the repelling electrode 1 experience the greatest acceleration owing to the intensification of the field in that region, and this more than offsets the increased range which would otherwise be expected for such electrons by virtue of their greater distance from the target electrode.

In the case of an electron entering in the plane M but at any angle to the target electrode, the trajectory is again, in conditions of true quadratic field configuration, a portion of a sine curve. Where the point of entry lies on the line marking the intersection between plane M and the target electrode 0 (as shown in FIGURE 16), the range S is given by the formula (4) $$S = \pi d \cos\beta \sqrt{\frac{V_0}{V_0 - V_1}}$$

where $\beta$ is the angle between the beam and the target at the point of entry. Here the longitudinal focussing conditions are different: a parallel beam will intercept the same length of the target electrode at entry and at impact. If angle $\beta$ is constant, then the angle $\gamma$ of impact will also be constant and equal to $\beta$ regardless of changes in potential $V_1$ and consequent changes in range.

Figure 16:
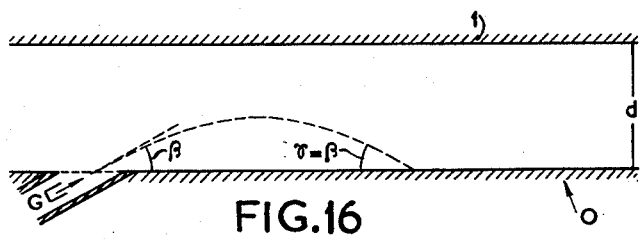

In either of the arrangements of FIGURES 15 and 16, the point of impact of the beam on the target electrode can be made to move in a straight line by varying the potential $V_1$ although in the case of FIGURE 14 it would be possible to raise the gun G and the tube neck to a position such as N2 of FIGURE 12.

Figure 17:
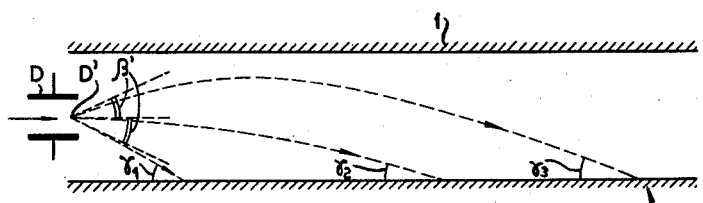

Alternatively the potential $V_1$ can be kept at a constant value less than $V_0$, and a straight line scan achieved by altering the angle of entry of the beam as shown in FIGURE 17. This may be effected by electrostatic deflection means (as shown at D) or electromagnetic deflection means. If the beam enters through a point D' at a distance $y_0$ from the target electrode, and at an angle $\beta$ measured from the target electrode, the range S is given by the formula:

(5)
$$S = d \cos \beta \sqrt{\frac{V_0}{V_0 - V_1} - \frac{y_0^2}{d^2}} \left[ \pi - \sin^{-1} d \sqrt{\frac{y_0}{\frac{V_0}{V_0 - V_1} \sin^2 \beta + \frac{y_0^2 \cos^2 \beta}{d^2}}} \right]$$

This formula is general, and includes Formulae 2 and 4 as special cases.

The three trajectories shown in FIGURE 17, may, for example, be obtained with a fixed voltage $V_1$ on the repelling electrode to ¾ $V_0$ and with deflections $\beta$ of ±23° effected by deflection means D, in which case the ranges S and angles of impact are given by the following table:

| $\beta$, ° | S/d | Angle of impact, $\gamma$° |
|---|---|---|
| +23 | 4.56 | 27 |
| 0 | 3.03 | 15 |
| −23 | 1.06 | 27 |

Thus, beyond a middle region, the angle of impact actually increases with the range S, the angle $\gamma 3$ of 27° corresponding to an angle of about 10° for a comparable range with axial entry of the beam as in FIGURE 15. For this reason the arrangement of FIGURE 17 can in practice give better focussing in the longitudinal direction at maximum range than scanning by variation of $V_1$ since the focussing illustrated in FIGURE 18 and predicted by Formulae 2 and 3 cannot be obtained in full owing to space-charge effects.

Of course, scanning may be obtained by a combination of the variable control potential method with the deflection method of FIGURE 17 and, in particular, one method may be used for the main scanning component while the other method is used to apply a correction.

Figure 23:
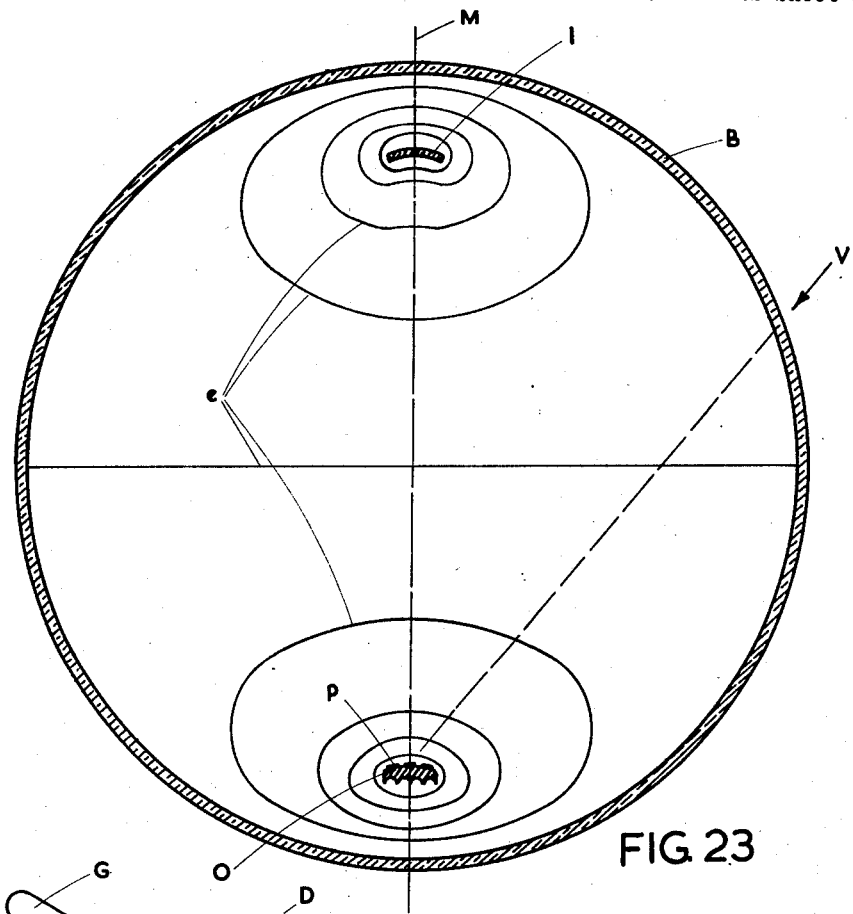

In the tubes described with reference to FIGURES 13–15, the control potential could be applied with such polarity as to deflect the beam towards the narrower electrode, i.e. the electrode at which the field intensity is greater, although it is preferred to employ the wider control electrode as the target electrode if it is desired that longitudinal focussing be obtained in the manner explained. However, if the control potential is thus reversed, a transverse focussing effect can be obtained by using a convex target electrode as shown in FIGURE 23, and this effect can outweigh the longitudinal de-focussing due to the fact that the increasing control field srtength near the target bends the ends portion of the beam thereby increasing the final angle of impact $\gamma$ for all trajectories (this is illustrated in FIGURE 19 by the shift from paths $b1$—$b3$ to $b1'$—$b3'$, and from angles of impact $\gamma 1$—$\gamma 3$ to $\gamma 1'$—$\gamma 3'$).

Figure 20:
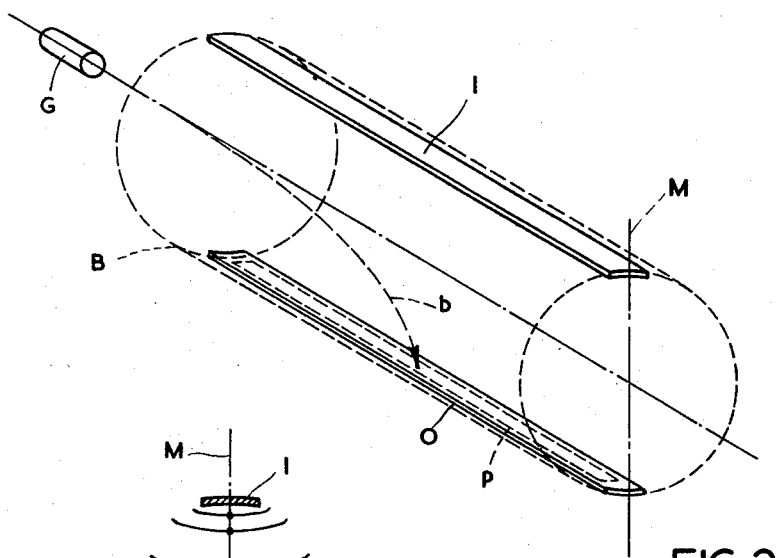

Whereas the electrode arrangements of FIGURES 13 to 15 provide an increase in the field strength towards only one of the electrodes, further arrangements will now be described with reference to FIGURES 20 to 24 wherein the intensity of the control field increases towards both control electrodes so that the focussing effects described with reference to FIGURE 18 and FIGURE 19 may be obtained simultaneously. In FIGURE 20 the trajectory space extends between a pair of elongated parallel control electrodes 0 and 1 carried by the wall of an envelope bulb which may have the right-cylindrical form indicated at B. The electrode 0 acts as target electrode and carries a phosphor coating $p$ for displaying the spot. The gun G is shown by way of example in a position corresponding to the neck position $N_0$ of FIGURE 12.

Figure 21:
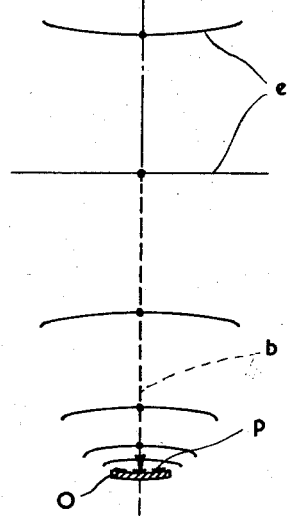

FIGURE 21 is a cross-section of an electrode system such as that of FIGURE 20, and the electrostatic control field configuration is represented by equipotential surfaces $e$ which increase in density towards both electrodes owing to the small widths of the latter as compared with their mutual spacing.

In both FIGURES 20 and 21 a longitudinal median trajectory plane M is indicated in which plane lie the beam trajectories (such as $b$).

FIGURE 22 is a longitudinal section of the field configuration set up by a control electrode system such as that of FIGURES 20 and 21, the section being taken along the median plane of symmetry M. The point of impact of the beam on the target electrode can be made to move in a straight line by varying the potential $V_1$ of electrode 1 in which case the beam may be directed into the control field in the plane M and parallel to the electrodes (e.g. from a gun in a neck in the position $N_2$ of FIGURE 12) or the beam may be directed away from the target electrode 0 as from an electron gun in a neck in the position $N_1$ of FIGURE 12. Alternatively, the potential $V_1$ can be kept constant at a value less than the potential $V_0$ of electrode 0, and a straight-line scan achieved by altering the angle of entry of the beam (e.g. from a gun in a neck in the position $N_0$ of FIGURE 12) by deflection means located at or near one end of the trajectory control space in the manner illustrated in FIGURE 19 (electrostatic deflection means are shown at D although, of course, electromagnetic means may equally be used).

Since the equipotential surfaces near electrode 0 are curved round the latter e.g. as shown in FIGURE 21, the control field near the target effects some additional focussing of the beam in the direction transverse to the median trajectory plane M. This effect would also apply if the electrode 1 of FIGURE 13 or FIGURE 14 were used as the target instead of being used as repelling electrode, and in any case the effect can provide even additional focussing in the direction transverse to the target if said curvature of the field is increased by providing the target electrode with an inner or operative surface of convex form. Conversely, if the equipotential surfaces near electrode 1 are curved and convex as viewed from the target, as is the case to a small extent in FIGURES 13, 14 and 21, then some degree of de-focussing will occur in the direction transverse to plane M. This effect may be reduced or eliminated, if necessary, e.g. by rendering concave the operative inner surface of the repelling electrode.

Such focussing consideration are taken into account in the arrangement of FIGURE 23. The repelling electrode 1 has a concave operative surface so as to modify the field pattern in such manner as to minimise de-focussing in the transverse direction. On the other hand, the target electrode 0 has a convex operative surface (with phosphor $p$) so as to increase the lateral focussing action as compared with a field such as that of FIGURE 21. Moreover, electrode 0 is a metal strip having considerable thickness to facilitate dissipation of heat generated locally at the point of impact of the beam and thus protect the phosphor; in addition, said strip has a grooved outer surface to assist heat radiation, said surface being preferably black.

The arrangement of FIGURE 23 is adapted to overcome a difficulty which has not yet been discussed, namely the accumulation of electrostatic charges on the bulb walls. For this purpose the electrodes are spaced inwardly from the right cylindrical bulb B, and the entire cylindrical inner surface of the latter is rendered conductive and is held at a potential intermediate between the voltage $V_1$ of electrode 1 and the potential $V_0$ of electrode 0. The field pattern shown corresponds to a bulb potential equal to ½ $(V_0 + V_1)$.

The lateral focussing action of the field curvature near the target electrode may be combined with a complementary action in the longitudinal or scan direction so as to obtain a spot of approximately round shape while maintaining a small spot size. This may be done by applying dynamic focussing to the beam while at the same time giving the initial cross-section of the beam an oval or elongated form with the major axis lying in the plane M, or by applying astigmatism dynamically to the beam in the same direction.

Actually, a varying degree of astigmatism is in effect provided by the focussing action of the control field described with reference to FIGURE 18. However, astigmatism can be applied dynamically near the electron gun or in the neck of the tube by known means.

Figure 11:
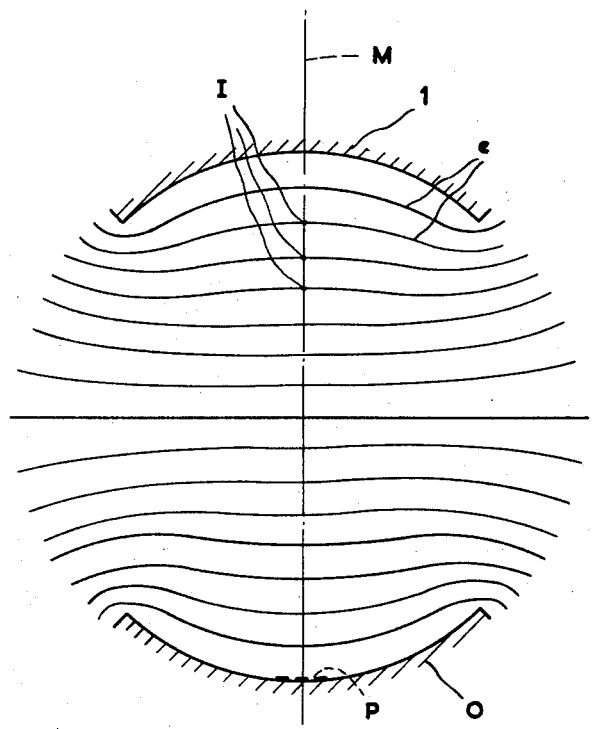

Although optically transparent control electrodes can be used in the arrangements of FIGURES 11 and 13 or 14 to permit viewing of the phosphor target p from the inner side, the small width of the electrodes renders the arrangements shown in FIGURES 20 to 23 especially suitable for special television display apparatus provided that the bulb (and any conductive coating thereon) is transparent at least in part. Such apparatus may employ a rotor having three cylindrical lenses and requiring an aperture of about 120° (as measured from the axis of rotation) through which the phosphor strip p may be viewed, as described in a copending United States application, Serial No. 616,981, filed October 19, 1956, now Patent No. 2,951,044; this is readily attainable, and in FIGURE 23 the mean direction for viewing is indicated at V. However, where it is difficult or impossible to obtain a continuous view of the inner or vacuum side of the phosphor strip over a sufficient angle, the arrangement may in many cases be modified by arranging for the outer surface of the phosphor strip to be viewed through the adjacent part of the wall of the bulb.

The arrangements of FIGURES 13 to 23 have been described with reference to a single selected trajectory plane M and a single scan path along the target. However, two or more trajectory planes may exist and be utilised, said planes intersecting the operative surface of the target in parallel rectilinear or substantially rectilinear lines of intersection along the entire length of said operative surfaces, and the control field having equipotential surfaces normal or substantially normal to each of said planes. A typical example arises in connection with colour television display. Thus in FIGURE 24 there is shown a bulb B having a target comprising for example three parallel phosphor strips $Tr$, $Tg$, $Tb$ adapted to luminesce in differing colours, e.g. red, green and blue. The control field is indicated as having equipotential surfaces $e$ substantially normal to three trajectory planes M, M′, M″ each of which intersects one of the phosphor strips.

Three separate electron guns may be used, each with its operative axis in one of the trajectory planes, in which case simultaneous scanning of three beams may be caused by variation (in time) of the common trajectory control field, or by common deflection means (such as means D of FIGURE 19) actuating the three beams. As an alternative, a single gun may be used with means for deflecting or displacing the beam transversely from one trajectory plane to another, e.g. at a spot-wobble frequency. In this alternative, correction for trapezium type distortion can be applied in known manner.

In the case of a television receiver required for black-and-white picture display as well as colour display, the target may comprise an additional phosphor strip, adapted to luminesce substantially in white, provided alongside a set of coloured strips for use when a monochrome signal is received. This reduces the matching requirements of the colour phosphor system.

The arrangements illustrated in FIGURES 11 to 24 employ conductive control electrodes which are parallel to each other and have parallel side edges. The constant cross-section of the electrode system causes the control field to have a cross-sectional configuration which is also constant or substantially constant along the operative length of the target electrode. However, this feature is not essential and it may for example be desirable in some cases to vary gradually the cross-section of one or each of the electrodes of a unidimensional scanning tube as described above so as to vary the field configuration along the length of the tube.

An example of a line-scan tube having a varying cross-sectional electrode and field configuration will now be described with reference to FIGURE 25.

In the arrangement shown in FIGURE 25, coaxial conductive control electrodes 0 and 1 of right-cylindrical form are provided with a complementary taper so that the mutual spacing of their edges remains approximately constant at a value sufficient to permit the maximum potential difference to be applied. The two electrodes are shown, for the sake of clarity, as isolated structures having a visible thickness. In practice, however, (as in many previous examples) they may both be conductive film laid on the inner surface of a right-cylindrical bulb, in which case the charge deposition problem is minimised due to the fact that almost the entire inner surface of the bulb is conductive. For this purpose part of the neck N, as shown, is also conductive together with the part of the envelope connecting the neck and the bulb. Such conductive part of the neck acts as a continuation of target electrode 0 and such electrode is preferably held at the same potential as the final anode of the gun as in the other illustrated line-scan examples. At the end of the tube remote from the neck, the electrodes 0 and 1 may be extended beyond the phosphor strip p to an extent greater than that shown (to avoid end-distortion of the control field), or said electrodes may be terminated by approximately hemispherical conductive surfaces conforming to a rounded end of the bulb.

The arrangement shown employs initial deflection means, e.g. plates D as shown, and the portion of the screen p nearest to the gun is scanned almost entirely by the action of means D (as indicated at $b1$) since electrode 1 has little or no effect, being shorter than electrode 0. Where electrode 1 has its narrowest width, the cross-section of the field configuration is similar to that shown in FIGURE 13. However, at this point the field strength is concentrated mainly above the level of the various beam trajectories. This cross-sectional configuration of the electrodes varies gradually along the length of the tube until, at the end remote from the gun, the field strength becomes approximately uniform along the trajectory plane M with a field configuration resembling approximately that of FIGURE 11.

Thus the longer trajectories, for which focussing in the direction of scan is more critical, encounter areas of greater field strength near the far end of the tube and the beam is bent into a larger angle of impact than the trajectories of middle length. Moreover, in the longer trajectories (illustrated at $b2$) the beam undergoes to a greater degree the focussing or astigmatic action described with reference to FIGURE 18.

Having described arrangements of conductive electrodes in which the field strength of the control field varies in the direction normal to the target screen (FIGURES 13 to 24) and an arrangement in which it varies also in the direction parallel to the screen (FIGURE 25), a further alternative will now be described with reference to FIGURE 26 in which arrangement a resistive repeller electrode is used to obtain a non-uniform field configuration.

Figure 26:
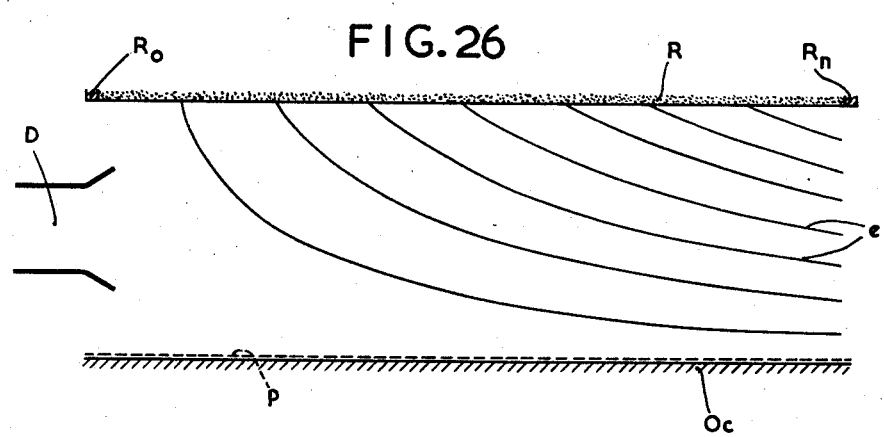

FIGURE 26 is a longitudinal section taken along a trajectory plane. The arrangement shown comprises a rectangular conductive target electrode $0e$ with a phosphor target and a rectangular resistive repeller electrode R parallel thereto, both electrodes being planar. The resistive electrode has a potential difference applied to its ends $R_0$—$R_n$ so as to create along its length a potential gradient with resultant curved equipotential surface e.g. as shown at $e$. The ends $R_0$—$R_n$ are provided with conductive strips or edges extending in a direction normal to that of the drawing so as to permit application of the potential difference uniformly over the full width of the electrode R.

The equipotential surfaces shown by way of example correspond to the case in which the resistance value of the electrode R is uniform all over its surface while the end of said electrode nearest to the gun (end $R_0$) is at the same potential ($V_0$) as the target electrode $0e$ and end $R_n$ is at a lower potential. In these circumstances the intersections between the or each trajectory plane and the surface $o$ are rectangular hyperbolae and, apart from edge effects, the field strength distribution is uniform along any cross-section parallel to edges $R_0$—$R_n$ and normal to the target. Although uniform in this example, the resistance distribution of electrode R may be varied to suit particular circumstances.

Although this arrangement may, if desired, employ variation of the potential applied to edge $R_n$ (or to $R_n$ and $R_0$) to effect scanning, and although the beam entry may be effected through an end portion of the target electrode $0c$ as in FIGURE 1, FIGURE 26 shows preliminary beam deflection means D (which may be electromagnetic although shown as electrostatic) since it is advantageous to use the deflection method of scanning with D.C. potentials on the control electrodes.

The field configuration shown provides good focussing effects in the direction of scan.

The arrangement of FIGURE 26 may employ elongated plane electrodes if the tube is to be used for uni-dimensional line scanning in which case the phosphor $p$ can be a narrow strip. Alternatively, the electrodes R and $0c$ may be extended in the direction normal to the drawing for use as a two-dimensional display device suitable for displaying a raster on a rectangular phosphor target $p$ associated with electrode $0c$. For this purpose the resistance of electrodes R may still have a uniform distribution all over its surface so that the field configuration shown in the drawing applies across the full width of the device. At the same time the deflection plates D may also be extended in the direction normal to the drawing so as to become a pair of elongated strips adapted to effect the frame scan (the increased capacitance of plates D can readily be tolerated in view of the low frequency of the frame scan). The line scan may then be effected by varying the point of entry of the beam into means D while maintaining constant the angle of entry. Such constant direction of entry implies that the trajectory planes employed successively by the two-dimensional control electrode system are displaced progressively during each line scan while maintaining a constant orientation and being all normal to the control electrode of the two dimensional system. This may be achieved with the aid of a uni-dimensional line scanning system similar to that described with reference to FIGURES 2 and 3 and employing a pair of elongated plane parallel control electrodes with a slit $S_0$ along the first target electrode $0$ to permit exit of the beam at a constant angle $\gamma$. Such preliminary line deflection system has an additional accelerating electrode $2$ beyond the target electrode $0$ and the arrangement is shown schematically in FIGURE 27 in perspective.

Figure 27:
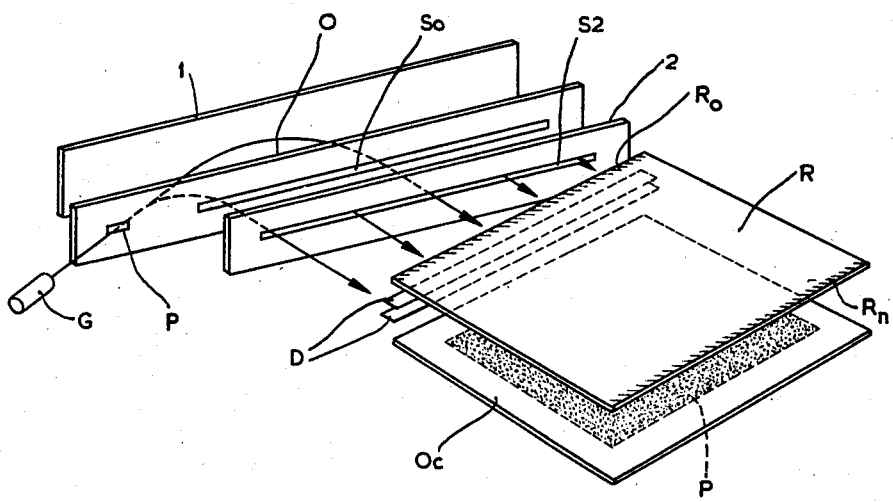

In the arrangement of FIGURE 27 a gun G directs the beam through aperture P into the first trajectory control space between electrodes $0$ and $1$. The first part of the trajectory is controlled by varying the control potential of said space as described with reference to FIGURE 1, and the beam emerges from the first trajectory space at a constant angle through the slit $S_0$. The beam is thereby directed through the accelerating space between electrodes $0$ and $2$ and through slit $S_2$ to the deflection system D and enters the latter in a direction normal thereto. Between the gun G and deflection means D the beam trajectory remains in a plane which passes between the two plates of the means D and is parallel to the electrodes R and $0c$. This permits the device as a whole to be generally flat since it obviates the need for an angled relationship between the two trajectory control systems such as is found in the arrangement of FIGURES 2 and 3. From deflection means D the beam enters the second trajectory control space (between the rectangular electrodes R and $0c$) at an angle which is varied by means D so as to provide the frame scan. The edges of electrode R which are parallel to the deflection means (edges $R_0$ and $R_n$) are rendered conductve and a constant D.C. potential is applied between these edges, the potential of edge $R_0$ being preferably the same as the potential $V_0$ of electrode $0c$. The two-dimensional phosphor target is indicated at $p$ and its operative area is smaller than the electrode $0c$ in order to avoid edge effects.

Figure 28:
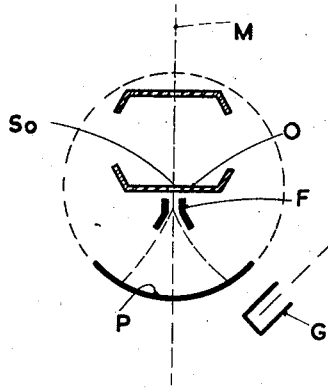
Figure 29:
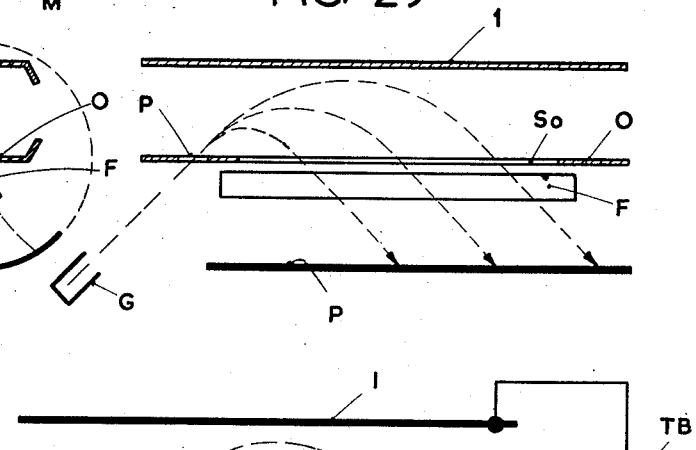

A device employing a control field having a uniform configuration in a selected trajectory plane may employ a second electrode having a slit along the locus of the points of impact of the beam so as to enable the beam to escape from the trajectory space at a constant angle $\gamma$. Such a device may be followed by means external to the exit slit for displacing the beam in a direction normal to that of the slit so as to effect beam control in a second dimension. Examples of such arrangements have already been described with reference to FIGURES 2 to 6, such devices providing two-dimensional control of the spot over a plane or substantially plane target. However, control over a two-dimensional target may also be employed for certain purposes with a cylindrical target, and FIGURE 28 illustrates in cross-section an arrangement in which deflection means F are provided to deflect the beam after its exit from the slit $S_0$ so as to sweep an arc of a cylindrical screen $p$. FIGURE 29 is a longitudinal section taken on the median plane M. This device is suitable for use in display arrangements employing cylindrical magnifying means in conjunction with a cathode ray display tube employing a cylindrical screen, as is described in a copending application, Serial No. 646,147, filed March 14, 1957, now Patent No. 2,927,315. The tube shown in FIGURES 28 and 29 may thus be employed in such manner that a sawtooth variation of the control potential between conductive electrodes $1$ and $0$ causes the beam to move along the slit $S_0$ and thus provide the line scan of a raster while the deflection means F operate at frame frequency to provide a frame scan of reduced dimensions which is extended by the optical magnifying means. With this arrangement the deflection plates F, electrodes $1$—$0$ (which are flanged to reduce edge effects) and the screen $p$ are all parallel to each other and can be located in a cylindrical envelope. A correcting component having frame frequency is superimposed on the line sawtooth voltage applied between the electrodes $1$—$0$ so as to ensure that all the line scans of a frame have their ends aligned between planes normal to the electrodes as required for the final raster to appear rectangular when viewed with its aspect ratio restored by the magnifying means.

The electrodes $1$ and $0$ of FIGURES 28 and 29 may be resistive instead of being conductive and may have their ends connected together by plane inclined conductive elements in the manner of the arrangement of FIGURE 10. In fact, since the arrangement of FIGURE 10 provides a constant angle of impact, it may be modified by provision of a slit along electrode $R'_0$ to pass the beam to a second control stage; if so modified, the arrangement of FIGURE 10 can also be used in place of the electrode system $1$ and $0$ of FIGURES 2 and 3 and FIGURE 27, an accelerating space being provided beyond the slit if desired.

The problem of charge deposition on the walls of the envelope has been mentioned previously, and one solution has been shown in FIGURE 23. A similar solution may be applied to a tube as shown in FIGURES 13 and 15, in which case the control electrodes can be placed inside, and spaced from, a cylindrical envelope bulb which has a conductive inner surface to which there is applied a potential intermediate between those of the control electrodes, the envelope potential being nearer in value to that of the wide second electrode than to that of the narrow repeller electrode.

A further arrangement which avoids the charge deposition problem can be obtained by providing the arrangement of FIGURE 10 with resistive side panels as aforesaid. This arrangement may be modified in its uni-dimensional form by providing the electrode $R_1$—$R'_0$ and the side panels as a single cylindrical resistive surface closed at its ends by plates located and inclined in the manner of the electrodes 1 and 0 of FIGURE 10.

Figure 30:
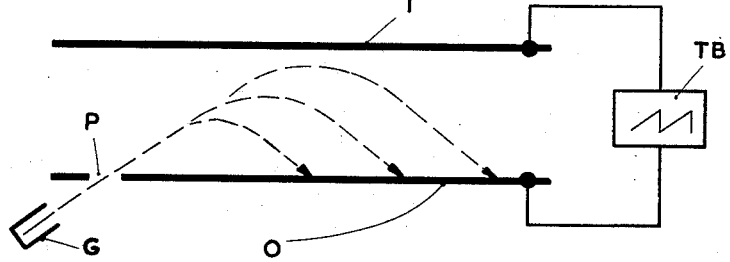
FIGURES 30 to 32 are simplified circuit diagrams.
Figure 31:
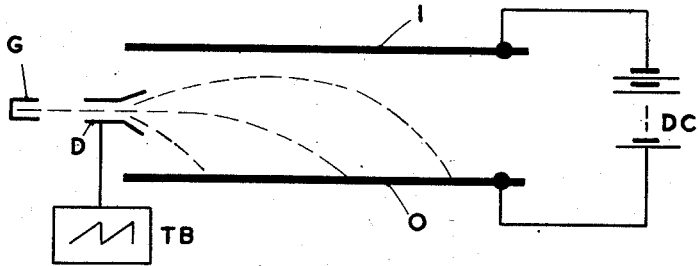
Figure 32:
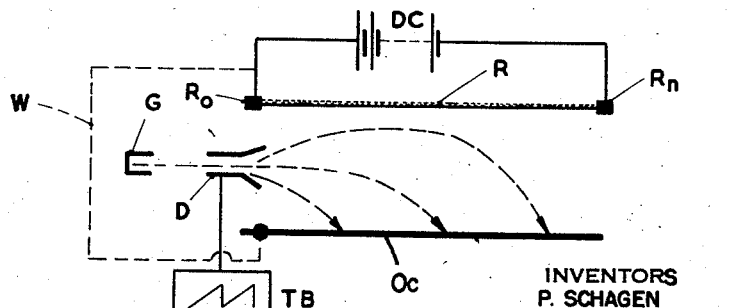

FIGURES 30 to 32 show schematically the simplified circuits required for some of the modes of operation described, such circuits being described in relation to scanning in the plane of the drawing.

FIGURE 30 of the accompanying drawings shows a pair of conductive control electrodes 1 and 0 with a gun G directing a beam into the trajectory space through an aperture P at a constant angle e.g. as in the arrangement of FIGURE 1. An appropriate time-base TB applies a sawtooth control potential between the electrodes.

The circuits of FIGURES 31 and 32 of the accompanying drawings are advantageous as compared with that of FIGURE 30 in that the or each control potential is a D.C. potential, so that there is no need to provide a sawtooth waveform at very high voltages, and this advantage is, of course, more marked in the case of a relatively fast scan such as a line scan.

In FIGURE 31 a pair of conductive electrodes 1 and 0 are shown connected to a source of high D.C. voltage, while scanning is caused by initial deflection means D, e.g. as in the case of FIGURE 17. Means D are fed by a time-base TB and may be electromagnetic if desired.

In FIGURE 32, a resistive repeller electrode R has its conductive ends or edges $R_0$ and $R_n$ connected to a D.C. source of high voltage by which a potential gradient is set up along the electrode in the manner described with reference to FIGURE 26. The conductive electrode $0c$ is held at a fixed potential with respect to the element $R_0$ and the potentials of $R_0$ and $0c$ may, if desired, be made equal by a direct connection as shown at W. Scanning is effected by a time-base feeding deflection means D as in FIGURE 31.

Figure 34:
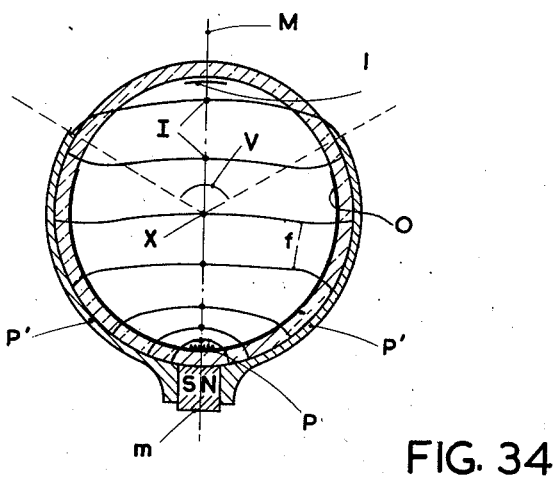
FIGURES 33 and 34 show in longitudinal elevation and cross-section respectively an arrangement employing permanent magnets as well as control electrodes to set up a static non-uniform control field.
Figure 33:
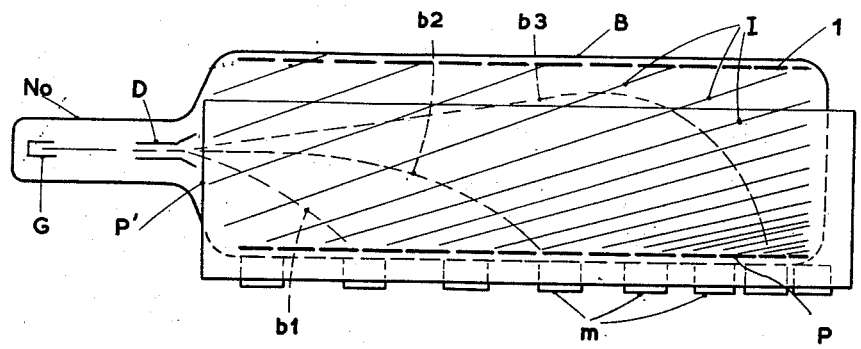

It has been explained that the action described with reference to FIGURE 19 tends to de-focus the beam in the longitudinal direction if the control field has a parallel configuration. It has also been explained that it may be desirable to accept this disadvantage in order to obtain a convex field configuration near the target e.g. as shown in FIGURE 23 and thereby effect focussing in the direction normal to the trajectory plane. However, transverse focussing of the type described with reference to FIGURE 23 may be obtained without the disadvantage of longitudinal de-focussing. This may, for example, be achieved by using a uni-dimensional arrangement as shown in FIGURES 33 and 34 of the accompanying drawings and employing permanent magnets $m$ and pole pieces $P'$ as well as control electrodes 1 and 0 of the type shown in FIGURES 13 and 15. In FIGURES 33 and 34 only the magnetic field configuration is shown, and it will be seen that the magnets are transversely magnetised as indicated by the references S—N and provide the desired convex field configuration near the target P. As with the effect shown in FIGURE 19, there would be a tendency to de-focussing of the beam in the longitudinal direction if magnets of equal strength were equally distributed along the length of the target, but such de-focussing is avoided in this example by spacing the magnets more closely towards the end remote from the gun G and thereby obtaining the inclined field configuration shown in FIGURE 33. Thus, in effect, the arrangement shown combines a magnet system with an electrostatic system as described with reference to FIGURES 13 and 15 of the accompanying drawings.

The magnet system of FIGURES 33–34 will now be described more fully, it being noted that FIGURE 33 is a schematic elevation of the structure with a superimposed longitudinal section of the magnetic control field configuration. As will be seen from FIGURE 34, the field distribution is approximately uniform in the plane M except near the target $p$. The arrangement employs a single magnet system or row of magnets $m$ provided with substantially cylindrical pole pieces $P'$. The field curvature near the target $p$ has a transverse focussing effect as aforesaid.

The arrangement is particularly suitable for television display apparatus employing a rotor having three cylindrical lenses and requiring an aperture of about 120° (as measured from the axis of rotation) through which the target may be viewed; this is readily attainable, and in FIGURE 34 such viewing aperture is indicated at V on the assumption that the axis X of the bulb B coincides with the axis of rotation.

In FIGURE 34 there is shown in side elevation a cylindrical envelope $N_0$ and B with the permanent magnet arrangement and the section of the magnetic control field which varies along the length of the target $p$ as indicated by the slope in the lines I of constant field intensity in the plane M. In this arrangement the pole pieces may have a constant cross-section similar to that of FIGURE 18 in which case the field pattern will be substantially of the same configuration at cross-sections taken at any point along the target, the field intensity varying, however, from one cross-section to another. The intensity of the field is graded longitudinally by using a number of permanent magnets $m$ spaced apart to a varying extent as aforesaid. This arrangement employs electrostatic deflection means D, as shown, or electro-magnetic deflection means to deflect the beam in the plane M and thus effect scanning as indicated by the beam paths $b1$–$b3$. As will be seen, the general effect is to cause the longer beam paths to enter progressively stronger fields so that the angle of beam impact increases with the range.

Apart from the specific example of FIGURES 33–34, it is more generally possible to employ a uni-dimensional electrostatic arrangement in accordance with the present invention in combination with a magnetic or electromagnetic arrangement.

What is claimed is:

1. A cathode-ray tube comprising an evacuated envelope elongated in a given direction and containing an elongated luminescent target, a first elongated control electrode arranged alongside and spaced from said target and a second elongated control electrode adjacent to said target and extending substantially along the full operative length thereof, said first and second electrodes lying generally in said given direction of elongation of the envelope and being provided for controlling the trajectory of an electron beam within an evacuated beam trajectory control space extending between said first electrode and the combination of the target and the second electrode, and an electron gun for directing an electron beam into said trajectory control space from the region of one end thereof with the effective gun axis in a plane which intersects the operative surface of said target along an approximately rectilinear line of intersection extending along the entire length of said operative surface, the gun having its effective axis directed away from said surface at an acute angle thereto, and the configuration of said first and second electrodes being such that they are adapted, on application thereto of differing potentials, to set up in the region of said plane a graded beam trajectory control field having equipotential surfaces intersecting substantially orthogonally said plane throughout the area thereof extending between said first and second electrodes.

2. A cathode-ray tube comprising an evacuated envelope containing a luminescent target, a first control electrode arranged alongside and spaced from said target and a second control electrode adjacent to said target and extending substantially over the full operative surface thereof, said first and second electrodes being provided for controlling the trajectory of an electron beam within an evacuated beam trajectory control space extending between said first electrode and the combination of the target and the second electrode, an electron gun, and means for directing an electron beam into said trajectory control space from the region of one end thereof at a varying angle over a range including directions away from the inner surface of said second electrode in at least one plane which intersects the operative surface of said target along an approximately rectilinear line of intersection extending along the said operative surface, the configuration of said first and second electrodes being such that they are adapted, on application thereto of differing potentials, to set up in the region of said plane a beam trajectory control field having equipotential surfaces intersecting substantially orthogonally said plane throughout the area thereof extending between the said first and second electrodes and having a graded distribution within said area.

3. A cathode-ray device comprising a pair of spaced control electrodes of elongated form and defining therebetween a trajectory control space, an electron-receiving target associated with one of said electrodes, means for launching an electron beam into said trajectory control space along a selected trajectory, and means for establishing in said trajectory control space a graded electrostatic electron-deflecting field that continuously increases in intensity along a given dimension of the device for bending said selected trajectory to terminate on said target and for providing a focusing effect for the beam which varies in accordance with the selected beam trajectory.

4. A device as claimed in claim 3 wherein the control electrodes are curved and possess a varying width along their elongated dimension.

5. A device as claimed in claim 3 wherein the electrodes possess resistance and the application of potentials thereto causes the deflecting field strength to increase in a direction away from the electron beam source.

6. A cathode-ray device comprising a pair of spaced control electrodes of elongated form and defining therebetween a trajectory control space, an electron-receiving target associated with one of said electrodes, means for launching an electron beam into said trajectory control space along a selected trajectory, and means for establishing in said trajectory control space a graded electrostatic electron-deflecting field that continuously increases in intensity along a given dimension of the device for bending said selected trajectory to terminate on said target and for providing a focusing effect for the beam, and one of said electrodes being concave and the other convex in cross-section to establish the graded field.

7. A device as set forth in claim 3 wherein the target comprises a set of parallel luminescent strips luminescing in different colors in response to electron bombardment.

8. A device as set forth in claim 7 wherein one electrode is narrower than the other electrode.

9. A cathode-ray device comprising an evacuated envelope containing a target, a repeller control electrode arranged alongside and spaced from said target, a second control electrode adjacent said target and defining with repeller electrode a trajectory control space, means for launching an electron beam into said space along a selected trajectory making a given angle of entry of the beam relative to the electrode, means including said repeller and second electrodes for establishing a graded control field to cause the path of said electron beam to be bent towards and thus strike said target, and means for varying the said angle of entry of the beam over a range including directions away from the inner surface of said second electrode so as to vary the selected beam trajectory and thereby vary the position of the point of impact of the beam along the operative surface of the target.

10. A device as set forth in claim 9 wherein the target comprises a set of parallel luminescent strips luminescing in different colors.

11. A cathode-ray device comprising a pair of elongated, continuous, spaced resistive electrodes defining therebetween a trajectory control space, a target associated with one of said electrodes and having an electron-receiving surface, means for launching an electron beam into said control space from an edge of the electrodes and along a selected trajectory, means for establishing in said control space an electromagnetic field to bend the beam trajectory toward the said one electrode and to thus strike the target, and means for applying potentials across said resistive electrodes to establish a graded field distribution within the control space.

12. A cathode-ray device comprising a pair of elongated, continuous, spaced electrodes defining therebetween a trajectory control space, a target associated with one of said electrodes and having an electron-receiving surface, means for launching an electron beam into said control space from an edge of the electrodes and along a selected trajectory, means for establishing in said control space an electromagnetic field to bend the beam trajectory toward the said one electrode and to thus strike the target, said other electrode possessing resistance, and means for applying a potential across the resistive electrode to establish a graded field distribution within the control space, said other electrode possessing a uniform distribution of resistance across its surface.

13. A cathode-ray device comprising a pair of elongated, continuous, spaced electrodes defining therebetween a trajectory control space, a target associated with one of said electrodes and having an electron-receiving surface, means for launching an electron beam into said control space from an edge of the electrodes and along a selected trajectory, means for establishing in said control space an electromagnetic field to bend the beam trajectory toward the said one electrode and to thus strike the target, said other electrode possessing resistance and being curved, and means for applying a potential across the resistive electrode to establish a graded field distribution within the control space.

References Cited in the file of this patent

UNITED STATES PATENTS

| | | |
|---|---|---|
| 2,332,876 | Uhlman | Oct. 26, 1943 |
| 2,449,558 | Lanier et al. | Sept. 21, 1948 |
| 2,464,562 | Diemer | Mar. 15, 1949 |
| 2,728,025 | Weimer | Dec. 20, 1955 |
| 2,777,084 | Lafferty | Jan. 8, 1957 |
| 2,795,729 | Gabor | June 11, 1957 |
| 2,795,731 | Aiken | June 11, 1957 |
| 2,809,324 | Shanafelt | Oct. 8, 1957 |
| 2,850,669 | Geer | Sept. 2, 1958 |
| 2,945,982 | Foster | July 19, 1960 |
| 2,957,097 | Schagen | Oct. 18, 1960 |
| 2,961,575 | Pohl | Nov. 22, 1960 |